United States Patent
Rakib

(10) Patent No.: US 9,344,769 B1
(45) Date of Patent: May 17, 2016

(54) HYBRID ALL DIGITAL FIBER TO CATV CABLE SYSTEM AND METHOD

(71) Applicant: Gainspeed, Inc., Sunnyvale, CA (US)

(72) Inventor: Shlomo Selim Rakib, Saratoga, CA (US)

(73) Assignee: GAINSPEED, INC., Sunnyvale, CA (US)

(*) Notice: Subject to any disclaimer, the term of this patent is extended or adjusted under 35 U.S.C. 154(b) by 0 days.

(21) Appl. No.: 14/328,494

(22) Filed: Jul. 10, 2014

Related U.S. Application Data

(63) Continuation of application No. 13/674,936, filed on Nov. 12, 2012, now Pat. No. 8,782,729, which is a continuation-in-part of application No. 13/555,170, filed on Jul. 22, 2012, now Pat. No. 8,644,706, and a (Continued)

(51) Int. Cl.
  *H04N 21/61* (2011.01)
(52) U.S. Cl.
  CPC .................. *H04N 21/6118* (2013.01)
(58) Field of Classification Search
  USPC .................. 725/111, 114, 118–119, 126, 129
  See application file for complete search history.

(56) References Cited

U.S. PATENT DOCUMENTS

| | | | |
|---|---|---|---|
| 6,281,996 B1 | 8/2001 | Krimmel | |
| 6,381,248 B1 | 4/2002 | Lu | |
| 7,623,532 B2 * | 11/2009 | Liva et al. | 370/401 |
| 7,639,620 B2 | 12/2009 | Chapman | |
| 7,990,977 B2 | 8/2011 | Desai et al. | |
| 8,311,412 B2 | 11/2012 | Rakib | |
| 8,365,237 B2 | 1/2013 | Rakib | |
| 8,644,706 B2 | 2/2014 | Rakib | |
| 8,782,729 B2 | 7/2014 | Rakib | |
| 8,826,359 B2 | 9/2014 | Rakib | |
| 8,910,230 B2 | 12/2014 | Rakib | |

(Continued)

FOREIGN PATENT DOCUMENTS

| | | |
|---|---|---|
| WO | WO 2013/126351 | 8/2013 |
| WO | WO 2013/126418 | 8/2013 |

OTHER PUBLICATIONS

Portions of prosecution history of U.S. Appl. No. 13/674,936, Apr. 10, 2014, Rakib, Shlomo Selim.

(Continued)

*Primary Examiner* — Mulugeta Mengesha
(74) *Attorney, Agent, or Firm* — Adeli LLP

(57) ABSTRACT

Producing advanced HFC CATV cable systems while easing the burden of backward compatibility. The system improves CATV data carrying capacity by moving RF QAM modulators from the cable head end to various individually or group addressed optical fiber nodes supplying neighborhood CATV cables, and sending data from the cable head IP backbone to the nodes over optical fiber as IP data packets. For high backward compatibility, the system digitizes legacy RF waveforms, or demodulates legacy QAM waveforms to QAM symbols, also transmits these over the optical fiber as IP data packets, and then reconstitutes back to original waveforms as needed. The system is thus able to easily handle legacy NTSC, FM, QPSK waveforms and do partial (QAM symbol level) compression of legacy QAM waveforms to and from multiple nodes without requiring additional optical fiber wavelengths. The system may use non-standard upstream/downstream CATV frequency splits, filter bank receivers, and FPGA/DSP/ASIC methods.

18 Claims, 10 Drawing Sheets

Related U.S. Application Data continuation-in-part of application No. 13/478,461, filed on May 23, 2012, now Pat. No. 8,773,965, and a continuation-in-part of application No. 13/400,415, filed on Feb. 20, 2012, and a continuation-in-part of application No. 13/346,709, filed on Jan. 9, 2012, now Pat. No. 8,510,786, and a continuation-in-part of application No. 13/035,993, filed on Feb. 27, 2011, now Pat. No. 8,365,237, and a continuation-in-part of application No. 12/907,970, filed on Oct. 19, 2010, now Pat. No. 8,826,359, and a continuation-in-part of application No. 12/692,582, filed on Jan. 22, 2010, now Pat. No. 8,311,412.

(60) Provisional application No. 61/385,125, filed on Sep. 21, 2010, provisional application No. 61/622,132, filed on Apr. 10, 2012, provisional application No. 61/511,395, filed on Jul. 25, 2011.

(56) References Cited

U.S. PATENT DOCUMENTS

| | | |
|---|---|---|
| 8,935,739 B1 | 1/2015 | Rakib |
| 8,938,769 B2 | 1/2015 | Rakib |
| 2003/0066087 A1* | 4/2003 | Sawyer et al. ............... 725/111 |
| 2005/0283816 A1 | 12/2005 | Weinstein et al. |
| 2006/0218616 A1 | 9/2006 | Schemmann et al. |
| 2007/0189770 A1 | 8/2007 | Sucharczuk et al. |
| 2008/0216144 A1* | 9/2008 | Weinstein et al. ............ 725/127 |
| 2009/0049492 A1 | 2/2009 | Pantelias |
| 2010/0313230 A1* | 12/2010 | Van Doorn et al. ........... 725/107 |
| 2010/0316384 A1 | 12/2010 | Sucharczuk et al. |
| 2012/0180101 A1* | 7/2012 | Davis et al. .................. 725/116 |
| 2014/0150047 A1 | 5/2014 | Rakib |

OTHER PUBLICATIONS

Portions of prosecution history of U.S. Appl. No. 13/756,302, Oct. 31, 2014, Rakib, Shlomo Selim.

International Search Report and Written Opinion for PCT/US2013/026750, May 8, 2013 (mailing date), Rakib, Shlomo.

International Search Report and Written Opinion for PCT/US2013/026885, Jun. 21, 2013 (mailing date), Rakib, Shlomo.

Author Unknown, "Data-Over-Cable Service Interface Specifications, CMAP Architecture Technical Report CM-TR-CMAP-V01-101222," Dec. 22, 2010, 48 pages, Cable Television Laboratories.

Author Unknown, "Data-Over-Cable Service Interface Specifications, Converged Cable Access Platform Architecture Technical Report, CM-TR-CCAP-V02-110614," Jun. 14, 2011, 46 pages, Cable Television Laboratories.

* cited by examiner

Simplified CATV spectrum diagram

Digitizing data and sending it as variously addressed digital data steams at same λ

Prior Art (downstream)

HYBRID ALL DIGITAL FIBER TO CATV CABLE SYSTEM AND METHOD

CROSS REFERENCE TO RELATED APPLICATIONS

This application is a continuation of U.S. patent application Ser. No. 13/674,936 "HYBRID ALL DIGITAL FIBER TO CATV CABLE SYSTEM AND METHOD", filed Nov. 12, 2012, inventor Shlomo Selim Rakib; now U.S. Pat. No. 8,782,729; application Ser. No. 13/674,936 was a continuation in part of U.S. patent application Ser. No. 13/555,170, filed Jul. 22, 2012, now U.S. Pat. No. 8,644,706; application Ser. No. 13/555,170 in turn claimed the benefit of provisional application 61/511,395, filed Jul. 25, 2011; application Ser. No. 13/674,936 was also a continuation in part of U.S. patent application Ser. No. 12/907,970, filed Oct. 19, 2010, now U.S. Pat. No. 8,826,359; application Ser. No. 13/674,936 was also a continuation in part of U.S. patent application Ser. No. 13/346,709, filed Jan. 9, 2012, now U.S. Pat. No. 8,510,786; application Ser. No. 13/674,936 was also a continuation in part of U.S. patent application Ser. No. 13/035,993, filed Feb. 27, 2011 now U.S. Pat. No. 8,365,237; application Ser. No. 13/674,936 was also a continuation in part of U.S. patent application Ser. No. 12/692,582, filed Jan. 1, 2010, now U.S. Pat. No. 8,311,412; application Ser. No. 13/674,936 was also a continuation in part of U.S. patent application Ser. No. 13/400,415, filed Feb. 20, 2012, now U.S. Pat. No. 8,863,213; application Ser. No. 13/674,936 was also a continuation in part of U.S. patent application Ser. No. 13/478,461, filed May 23, 2012, now U.S. Pat. No. 8,773,965; application Ser. No. 12/907,970 claimed the priority benefit of provisional application 61/385,125, filed Sep. 21, 2010; application Ser. No. 13/478,461 claimed the priority benefit of provisional application 61/622,132, filed Apr. 10, 2012; all have the inventor Shlomo Selim Rakib; the contents of all of these applications are incorporated herein by reference.

BACKGROUND OF THE INVENTION

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to 1-GHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

A more detailed discussion of prior art in this field can be found in copending application Ser. No. 12/692,582, the contents of which are incorporated herein by reference.

Prior art work with various types of CMTS systems and fiber nodes includes Liva et. al., U.S. Pat. No. 7,149,223; Sucharczuk et. al. U.S. Patent application publication 2007/0189770; Sawyer et. al., U.S. Patent application publication 2003/0066087; and Amit, U.S. Pat. No. 7,197,045.

BRIEF SUMMARY OF THE INVENTION

As user demand for ever increasing amounts of downstream and upstream bandwidth increases, further improvement and advances in HFC technology are needed.

The invention is based, in part, upon the realization that in order to make further advances in HFC technology, deviations from both the prior art schemes to allocate upstream and downstream data on the CATV portion of the HFC network, and deviations from the prior art schemes to allocate upstream and downstream data on the fiber portion of the HFC system, would be useful.

In order to make massive improvements in system performance, in some embodiments it will be useful to implement new schemes for data transmission on the optical fiber portion of the HFC network, and implement new schemes for data transmission on the CATV portion of the HFC network as well.

The optical waveforms presently used on the fiber portion of optical fiber wavelengths of present HFC systems are often just frequency shifted versions of the same waveforms used to transmit RF signals on the CATV cable. Although these direct RF to optical and back to RF waveform reproduction methods have the advantage of simplicity, due to various optical fiber signal propagation effects, such as Raman scattering, such RF to optical shifted CATV waveforms make inefficient use of available optical fiber spectrum. This is because various optical fiber effects, the various waveforms become smeared or distorted, resulting in crosstalk between neighboring optical fiber wavelengths, and the CATV waveforms are not at all optimized to cope with these effects. By shifting to alternative types of waveforms, such as the waveforms used to transmit Gigabyte Ethernet (GigE) signals (which often use more distortion resistant waveforms such as binary phase shift keyed (BPSK) or quadraphase-shift keying (QPSK) modulation), a much higher amount of data may be sent over the optical fiber. The rate of data transmission per wavelength can be much higher, and different wavelengths may be spaced much closer together.

At the same time, on the radio-frequency (RF) side of the HFC network, the CATV spectrum is also used inefficiently. Much of the available 5 MHz to approximately 1 GHz CATV frequency is presently filled up with QAM channels that, most of the time, are carrying downstream data that is not actually being used (at that time) by the various households that are connected to the cable. Another problem is that only a tiny region of CATV spectrum (usually 5-42 MHz), is allocated for upstream data. This relatively narrow region of frequencies must carry the upstream data for the entire CATV neighborhood. This results in great limitations on the bandwidth or amount of data that can be uploaded from the various households. Thus typical CATV systems are asymmetric, with the downstream data rates being much higher than the upstream data rates.

The invention teaches new HFC systems and methods to carry much higher amounts of upstream and downstream data. On the fiber portion of the HFC system, the invention teaches use of non-CATV compatible waveforms (e.g. GigE rather than QAM waveforms) which can carry much higher amounts of data over long distances. On the cable portion of the HFC system, the invention teaches improved systems and methods that utilize the limited 5 MHz to 1-GHz bandwidth of CATV cable more efficiently.

The invention operates, in part, by use of intelligent optical fiber nodes, and is in part a further extension of the CMRTS optical fiber nodes previously discussed by copending U.S. patent application Ser. No. 12/692,582 and the other copending patent applications previously discussed.

In some embodiments, the invention may be a system or a method based on digital optical fiber nodes operating in a Hybrid-Fiber CATV-Cable (HFC) network. Such systems generally comprise a cable head end, which is often in IP communication with an IP backbone such as the Internet or other high speed digital network. These HFC networks also generally also comprise one or more optical fibers in communication with the head end, as well as at least one and often many digital optical fiber nodes (DOFN).

These digital optical fiber nodes have some elements in common with the Cable Modem Remote Termination Systems (CMRTS) and Digital Cable Modem Remote Termination systems (D-CMRTS) previously described in various copending applications such as parent U.S. application Ser. No. 12/692,582, 61/385,125, 12/907,970, 13/346,709, 13/478,461, and 13/555,170, the contents of which are incorporated herein by reference. As a result, these digital optical fiber nodes (DOFN) will frequently be discussed in the alternative in this disclosure as D-CMRTS units.

To form an HFC system, these various DOFN or D-CMRTS units will be connected to (i.e. in RF communication with) various CATV cables (e.g. coax cable, capable of RF transmissions), and at least one CATV cable device which will be various cable modems, set top boxes, digital televisions, computers, and the like.

Although, as discussed in the earlier disclosures as well, the inventor's earlier D-CMRTS units were designed from the beginning with a high capability to provide additional data handing capability to CATV systems (e.g. above and beyond the present DOCSIS 3.0 standard), one challenging problem is how to provide even more functionality while still providing the ability to gracefully operate in an environment with large amounts of legacy equipment.

A unique aspect of the present disclosure is that the improved DOFN or D-CMRTS units disclosed herein, while providing advanced functionality, and often totally abandoning use of optical versions of the standard QAM, NTSC, FM waveforms on optical fiber, are still highly capable of operating with legacy equipment.

Here, systems are disclosed that are designed with a high capability to operate in the digital optical fiber domain (e.g. using optical fiber digital transport protocols such as GigE) while still providing CATV RF signals carrying various types of legacy analog CATV RF waveforms, such as analog NTSC television channels, FM audio channels, QPSK channels, QAM channels and the like. The present methods have the additional advantage that because digital data transport protocols can easily carry data packets to and from many alternative addresses, the invention's methods can operate without requiring the use of, for example, large numbers of alternative optical fiber wavelengths. By contrast, under prior art methods, use of large numbers of alternative optical fiber wavelengths was required in order to accommodate the many different types of analog legacy CATV waveforms that can originate from many different types of legacy optical fiber nodes.

According to the invention, such improvements can be made by, for example, converting legacy CATV analog waveforms to a digital form by high speed analog to digital converters and or QAM waveform demodulation into the underlying QAM symbols. This approach has the advantage that these waveforms can then be transformed to digital data packets (IP data packets) without the system otherwise needing to understand what the underlying data content of the waveforms is.

(For further discussion on QAM symbol methods, please see copending application Ser. No. 13/478,461 "EFFICIENT BANDWIDTH UTILIZATION METHODS FOR CATV DOCSIS CHANNELS AND OTHER APPLICATIONS", the contents of which are incorporated herein by reference.

The digitized waveform data can then be transported as IP packets over the HFC optical fibers using digital optical fiber data transmission format such as GigE.

More specifically, CATV legacy downstream RF waveforms of any type (e.g. NTSC, FM, QPSK) and/or more standard CATV downstream RF waveforms such as various QAM waveforms can be digitized by using a high speed analog to digital converter or other method to sample and digitize these legacy downstream RF waveforms, thus producing digital samples of the legacy downstream RF waveforms. This digital data which can then be converted to IP packets and sent over the optical fiber. Alternatively, and more efficiently in the case where more standard RF QAM waveforms are being transmitted downstream, these RF QAM waveforms, which are complex waveforms constructed using various underlying QAM symbols, may be demodulated and the underlying QAM symbols determined. These demodulated QAM symbols can then also be converted to various data packets and optically transmitted downstream over the HFC optical fiber or fibers.

Once in the form of IP data packets, low cost equipment such as inexpensive switches can then be used to easily sort and transport these IP data packets to and from various devices.

To reconstruct these various legacy CATV RF waveforms, at the digital optical fiber node(s) or D-CMRTS unit(s), various RF digital reconstitution devices may be configured to accept the digital samples of downstream RF waveforms (which were digitally transmitted downstream over the optical fiber), and reconstitute these digital waveform samples into one or more downstream digitally reconstituted RF waveforms channels that essentially reproduce the original RF waveforms.

Alternatively or additionally, at the digital optical fiber node(s) or D-CMRTS unit(s) there can also be one or more remodulator devices configured to accept the downstream digital QAM symbols that were transmitted over the optical fiber, and remodulate these QAM symbols into one or more downstream QAM symbol, again producing remodulated RF QAM waveforms and channels that essentially reproduce the original RF QAM channels.

To provide still higher levels of service (e.g. to provide higher CATV data carrying capability, and provide functionality beyond the present DOCSIS 3.0 standard), the digital optical fiber nodes or D-CMRTS units will often also contain one or more IP to QAM conversion devices such as QAM modulators. These QAM modulators may be configured to accept downstream digital IP data packets transmitted over the optical fiber, and to modulate these digital IP data packets into one or more downstream IP based RF QAM channels. These can be broadcast QAM channels, narrowcast QAM channels, on-demand QAM channels, and so on.

Often, according to the invention, the digital optical fiber nodes or D-CMRTS units will employ two or more of the above options, and will thus use a RF combiner device configured to combine any of these digitally reconstituted RF channels, QAM symbol remodulated RF QAM channels and these IP based RF QAM channels, and then transmit these various RF channels downstream over the CATV cable to the various CATV cable devices.

DETAILED DESCRIPTION OF THE INVENTION

Figure 1:
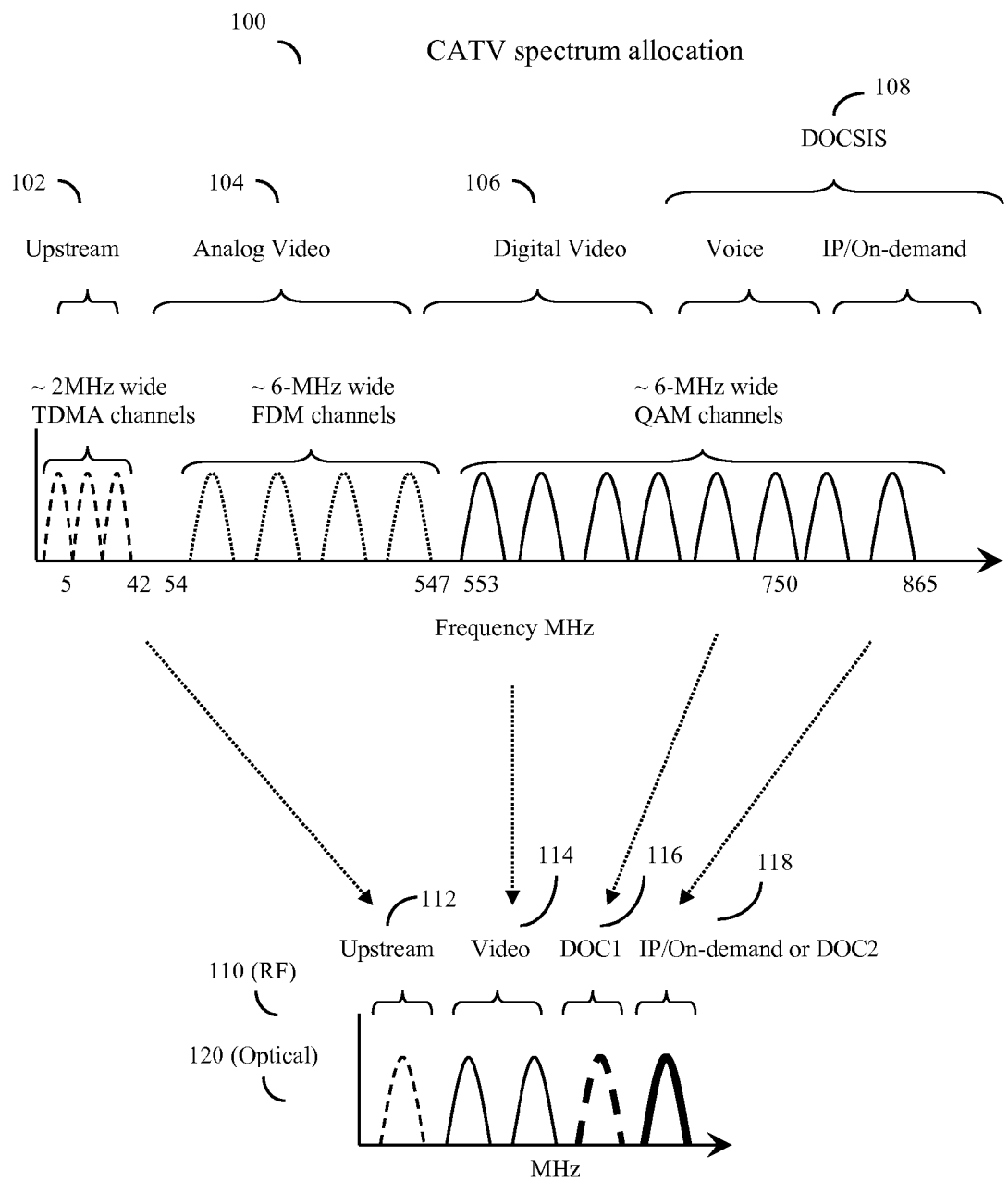
FIG. 1 shows an overall view of the various frequencies and data channels that are presently allocated for a typical CATV cable carrying legacy analog television FDM channels, QAM digital television channels, and various types of DOCSIS data.

Nomenclature: In this specification, the term "legacy signals" will often be used to describe various older standard CATV RF signals such as NTSC (television) signals, FM radio signals, set top box signals and the like. It should be understood, however, that the invention's methods will in fact operate with any type of RF signal. Thus the term legacy signals, although intended to improve readability by reminding the reader that the invention's methods are particularly useful for coping with various CATV legacy RF waveforms, is not otherwise intended to be limiting.

As previously discussed, prior art schemes of transmitting HFC data in the form of one or more CATV analog modulated wavelengths of light, along optical fiber, tended to be inefficient. That is, the prior art methods limited the amount of data that could be sent. This is because the analog waveforms used to transmit RF signals on CATV cable work inefficiently when transposed to optical wavelengths. Due to various effects including Raman scattering, and other nonlinear optical fiber effects, when too many analog modulated light wavelengths are placed onto an optical fiber too close together (in terms of wavelength differences), cross-talk between the different wavelengths tends to degrade the complex CATV RF analog signals (usually composed of many QAM modulated waveforms) to the point where crosstalk may render the signals useless.

As a result, to prevent the CATV modulated analog signal from degradation when carried over optical fiber, the wavelengths must be rather widely spread out. Thus due to cross talk effects, an optical fiber may only be capable of transmitting a few (e.g. 8) inefficiently modulated CATV signals, each transmitting about 6 Gigabits of data per second.

By contrast, if more efficiently digitally modulated signals (e.g. GigE data formats) were used, the same stretch of optical fiber might be capable of transmitting many more wavelengths (e.g. 80) of signals, and each wavelength in turn may transmit far more data, such as between 10-100 Gigabits of data per second.

Copending application Ser. No. 12/692,582 taught the advantages of producing a new type of optical fiber node, there called a Cable Modem Remote Termination System (CMRTS) device, which essentially pushed much of the functionality (such as generating QAM signals) of the prior art Cable Modem Termination Systems (CMTS) from the central cable head down to many distributed optical fiber nodes servicing neighborhood CATV cables. Thus according to application Ser. No. 12/692,582, non-CATV compliant signals may be sent to and from the central cable head to various remote CMRTS optical fiber nodes by optical fibers carrying light modulated by more efficient digital Ethernet protocols (e.g. GigE signals). The CMRTS optical fiber nodes then converts these non-CATV compliant signals into CATV compliant RF signals, such as a plurality of different RF QAM modulated signals, and/or other types of signals.

The present invention further builds upon this concept, and further teaches the advantages that can be obtained by reducing or dropping additional backward compatibility requirements, such as the requirement that legacy RF waveforms (e.g. QAM waveforms) be transmitted along the HFC optical fiber(s) while preserving the essential waveform characteristics (e.g. requiring that the optical QAM waveforms be the same as the RF QAM waveforms).

Other departures from pure backward compatibility may also be reduced. For example, according to the invention, the prior art CATV upstream requirements that upstream data must be carried as a number of 2 MHz wide QAM channels in the 5-42 MHz region, may be dropped in favor of alternate upstream schemes that provide for greater amounts of upstream data to be transmitted. That is the 5-42 MHz region may be extended into the higher frequency ranges—for example extended to the 5-547 MHz region, which will allow for a higher rate of upstream data to be transmitted, but of course will cut into the rate of transmission of downstream data.

However even if the upstream bandwidth problem is solved at the CATV cable side of the HFC system, the optical fiber itself, if used according to prior art schemes (e.g. shove the analog signal over the optical fiber in an essentially unchanged form) will now be rate limiting. That is, if a large number of different neighborhoods, each with their own stretch of CATV cable, are now enabled to start transmitting much more upstream data, unless the method of sending data over the fiber portion of the HFC network is changed, there will soon be a bottleneck at the fiber stage. This is because the prior art HFC methods of handing upstream data would, in general, simply convert the analog RF modulated CATV upstream waveforms into equivalently modulated optical fiber infrared light waveforms, and then transmit this data back over the optical fiber. Although such conversion processes can be easily done with inexpensive converters, this scheme has the drawback, as previously discussed, that they are not optimized for optical fiber. Consider the problem of pooling upstream data from multiple neighborhoods. Although the data CATV RF data from each neighborhood might be converted to a slightly different infrared frequency, put on optical fibers, the fibers combined and a composite multiple wavelength signals sent upstream, the inefficient CATV RF modulation schemes mean that each wavelength will carry only a relatively small amount of data. Further, due to crosstalk effects, the number of different neighborhoods worth of data that can be pooled is also limited. So due to prior-art inefficiencies, the potentially very large ability of the optical fiber to carry upstream data rapidly becomes limiting.

However, again by reducing the requirements that the HFC system be fully backward compatible in terms of inefficiently carrying legacy analog RF waveforms over optical fiber; the much higher amount of upstream bandwidth that would be generated under the invention can now be handled by repackaging the upstream data into more efficient modulation formats, such as the digital (GigE) modulation format, before transmitting the data on the optical fiber. Thus, according to the present invention, a smaller number of higher data density and more efficiently modulated optical fiber optimized signals, such as GigE data packets may now sent. This overcomes the inefficiencies of prior-art optical fiber modulation schemes, and helps remove the optical fiber upstream transmission bottleneck.

As per copending application Ser. No. 12/692,582, the present disclosure relies, in part, upon a radically different CMTS design in which the QAM modulators in the CMTS PHY section (used to ultimately provide the waveforms used to send RF data signals to a given individual cable) are often not located at the central cable head, but rather are divided and pushed out to the distant optical fiber nodes of the HFC network. That is, in contrast to prior art designs, were the QAM modulators were are located in the PHY units of main (centralized, e.g.—cable head) CMTS line cards on the central CMTS units; in the present invention, some or all of the QAM modulators are located in the PHY sections of remote or distributed CMRTS optical fiber nodes.

Alternatively, where for greater compatibility with legacy equipment is desired, at least some of the QAM modulators, or other RF signal generators such as NTSC television, FM radio, set top box QPSK signals and the like can still remain at the head end. However in this embodiment, the legacy RF waveforms output by the legacy head end equipment will usually be digitized before optical transmission. This digitization can be done by various means, including high frequency analog to digital sampling, or by for example demodulating various QAM waveforms, determining the underlying QAM symbols used to generate the QAM waveforms, and digitally sending the results. At the optical fiber node, these RF waveforms can then be regenerated, for example by digital to analog conversion and RF modulation, or using the digitally sent QAM symbols to control one or more RF QAM modulators.

Often however, it will be useful to simply send the data to the various optical fiber nodes in the form of standard IP packet type digital data. The optical fiber nodes can examine the data packets, determine which packets correspond to what signals, and for example then use the appropriate data packets to drive various optical fiber located RF QAM modulators (e.g. for broadcast QAM signals, narrowcast QAM signals, DOCSIS QAM signals, etc.) as desired.

In the prior Ser. No. 12/692,582 application, these advanced optical fiber nodes with local QAM modulators were called Cable Modem Remote Termination System (CM-RTS) units. Here, to better emphasize the ability of the present invention to function using Digital Wavelength Division Multiplexing (e.g. use of alternate data transmission formats such as 1GigE, 10GigE, EPON, BPON, GPON, 10GPON, SONET, Fiber Channel, FSAN, and the like) here the still more capable CMRTS units of the present invention will be termed D-CMRTS units, where the D may be used to symbolize the Digital encoding/decoding methods of the D-CMRTS units with respect to legacy signals To better emphasize the changes in functionality at the head end of the HFC system, the higher capacity cable modem termination system (CMTS) at the head end will often be referred to as D-CMTS units, where the D again is used to symbolize the digital encoding capability of the D-CMTS units.

As per the CMRTS units that were previously disclosed in Ser. No. 12/692,582, the D-CMRTS units disclosed herein will often also be located at the final network fiber nodes (FN) between the fiber portions of the HFC system, and the cable portions of the HFC system.

In the CMTS systems discussed in Ser. No. 12/692,582, some QAM modulators were located in the centralized CMTS PHY sections at the cable head, while some QAM modulators were located at the remote CMRTS units. The CMTS QAM modulators were used for sending data, such as a standardized package of cable TV channels and perhaps a basic level of DOCSIS service, which might be generally requested by many neighborhoods; over optical fiber using RF CATV (e.g. QAM) modulated infrared light signals. This helped maintain backward compatibility with prior art HFC systems.

Although in this present disclosure, in order to focus on aspects of the invention that can provide higher amounts of upstream and downstream data to subscribers, this type of backward compatibility is not discussed in as much detail. However in some embodiments, the methods of the present disclosure may also take advantage of these backward compatible aspects of Ser. No. 12/692,582. For example, some QAM modulators may continue to send CATV modulated (e.g. QAM) waveforms over optical fibers at certain legacy wavelengths, such as 1310 nm, as desired, and these can be converted back to QAM RF signals at the optical fiber node by simple optical to electronic (O/E) transducers.

In other words, the present all digital invention does not become invalid simply because someone puts standard CATV waveforms on the optical fiber (for example at a different wavelength than the wavelengths used by the invention). It is possible to contemplate, for example, a mixed neighborhood system where the invention's all digital methods are used for some neighborhoods being supplied by an optical fiber at a first set of optical wavelengths, and legacy equipment functions in other neighborhoods being supplied by the same optical fiber, but operating at a second set of optical fiber wavelengths.

In a preferred embodiment, to maintain backward compatibility, the various legacy head end waveforms, such as QAM waveforms, NTSC television waveforms, QPSK waveforms and the like (during transmission over optical fiber both downstream from the head end to the optical fiber nodes, and upstream from the optical fiber nodes to the head end) can be digitized for transmission by various methods, and then reconstituted after optical fiber transmission. As previously discussed, these digitization methods can range from brute force (i.e. simple high speed analog to digital sampling at around the Nyquist frequency (e.g. 2× the highest frequency of the underlying waveform), as well as more sophisticated methods such as demodulating the various QAM waveforms to extract the underlying QAM symbols used to produce the waveform in the first place.

Often the brute force, high frequency analog to digital sampling methods may be more suitable for legacy NTSC, FM, or QPSK waveforms (channels). By contrast, QAM demodulation methods may be more suitable for QAM channels transmitting various SD or HD digital television, DOCSIS QAM channels, and the like.

In general, however, digitally sending IP data packets, such as IP data packets containing a variety of data such as broadcast QAM channels, narrowcast QAM channels, DOCSIS channels, and other types of channels tends to be more efficient (i.e. minimizes the bits per second rate required). Thus when not needed for legacy purposes, generally the methods described herein will tend to prefer use of methods that transmit data to the optical fiber nodes using IP data packets (e.g. GigE format), and the optical fiber nodes in turn will take these IP data packets and convert them to the various QAM waveforms and the like required for RF transmission over the CATV cable.

Thus some embodiments of the present invention may elect to have no QAM modulators at the cable head whatsoever, and send pure non-CATV compatible waveforms (e.g. digital IP data packets) through the optical fibers. These systems may rely on the remote D-CMRTS units to generate all of the downstream QAM signals in the system.

Thus in one embodiment, the invention may be a method for enhancing the data carrying capacity of a hybrid fiber cable (HFC) network with a cable head, an optical fiber network, a plurality of optical fiber nodes, a plurality of individual CATV cables connected to the plurality of optical fiber nodes (D-CMRTS units), and a plurality of individual cable modems, each with differing data requirements, connected to each of the individual CATV cables.

This method may work by using at least one optical fiber, operating at one or more wavelengths, to transport a first set of downstream data from the cable head to the optical fiber nodes. This first set of downstream data may be transmitted in a digital format that is not capable of being directly injected into individual CATV cables by simple optical to RF converters.

Here, generally so much data may be transmitted that if all of the first set of downstream data was converted into RF QAM waveforms, the bandwidth of this data would exceed the available bandwidth of any of the individual CATV cables in the system. To avoid this problem, generally only a selected portion of this first set of downstream data will be converted into downstream RF QAM waveforms at these optical fiber nodes.

What portions of the optical fiber downstream data are selected for any given CATV cable neighborhood (with its own optical fiber node and CATV cable) may differ. At the optical fiber nodes, data packets will be selected, and these selected data packets will be converted into downstream RF QAM waveforms that in turn will be injected into the individual CATV cables.

Here, the main constraint is that for each individual CATV cable the downstream RF QAM waveforms should be selected so that the sum total of the selected downstream RF QAM waveforms do not exceed the available bandwidth of the individual CATV cables.

In a preferred embodiment, the invention's D-CMRTS units will often be designed to be highly software configurable, so that the ability of the D-CMRTS units to operate their remote or distributed QAM modulators to send downstream data, as well as the ability of the D-CMRTS units to operate various RF packet processors that receive multiple RF bursts of modulated upstream data from various cable modems, demodulate the bursts, digitize and reassemble this upstream data into packets, and retransmit this data back upstream, can be reconfigured by remote software. Such methods can greatly simplify the management and configuration of the distributed D-CMRTS network.

As one simplified example, in order to supply a standardized set of TV channels and other services to three cables in three neighborhoods, the head end equipment may have QAM modulators in their PHY units (See FIG. 7, 614) set to drive an optical fiber with multiple QAM signals at optical wavelengths.

If backward compatibility is desired, then head end may have digital converter units (399) that intercept output from the legacy head end QAM, FM, QPSK modulators and other RF modulators (614), and digitize this output by relatively brute force methods (high speed analog to digital converters, QAM demodulation into QAM symbols). The digital output from these converters can then be transmitted along optical fiber (218) along with other digital traffic (e.g. from GigE PHY modulators 620) to the optical fiber nodes.

In some neighborhoods, simple "dumb" converters and "dumb" optical fiber nodes can take this digital data from the legacy head end equipment (614), and convert it back to legacy QAM, FM and QPSK signals by various simple methods such as digital to analog conversion (600), QAM remodulation using the QAM symbols (603), and the like. These "dumb" converters and optical fiber nodes can then inject these reconstituted RF signals into those neighborhood CATV cables (226) that are equipped with "dumb" converters and optical fiber nodes.

If backward compatibility is not desired, in some embodiments, the cable head end may have no QAM modulators (or other modulators such as FM and QPSK modulators in their CATV PHY units 614), and all signals going out to the various D-CMTRS optical fiber nodes along the fiber portion of the network (218) may be digitally modulated in GigE or other format. Please refer to Ser. No. 12/692,582 for a more detailed discussion of the backward compatibility options.

Figure 7:
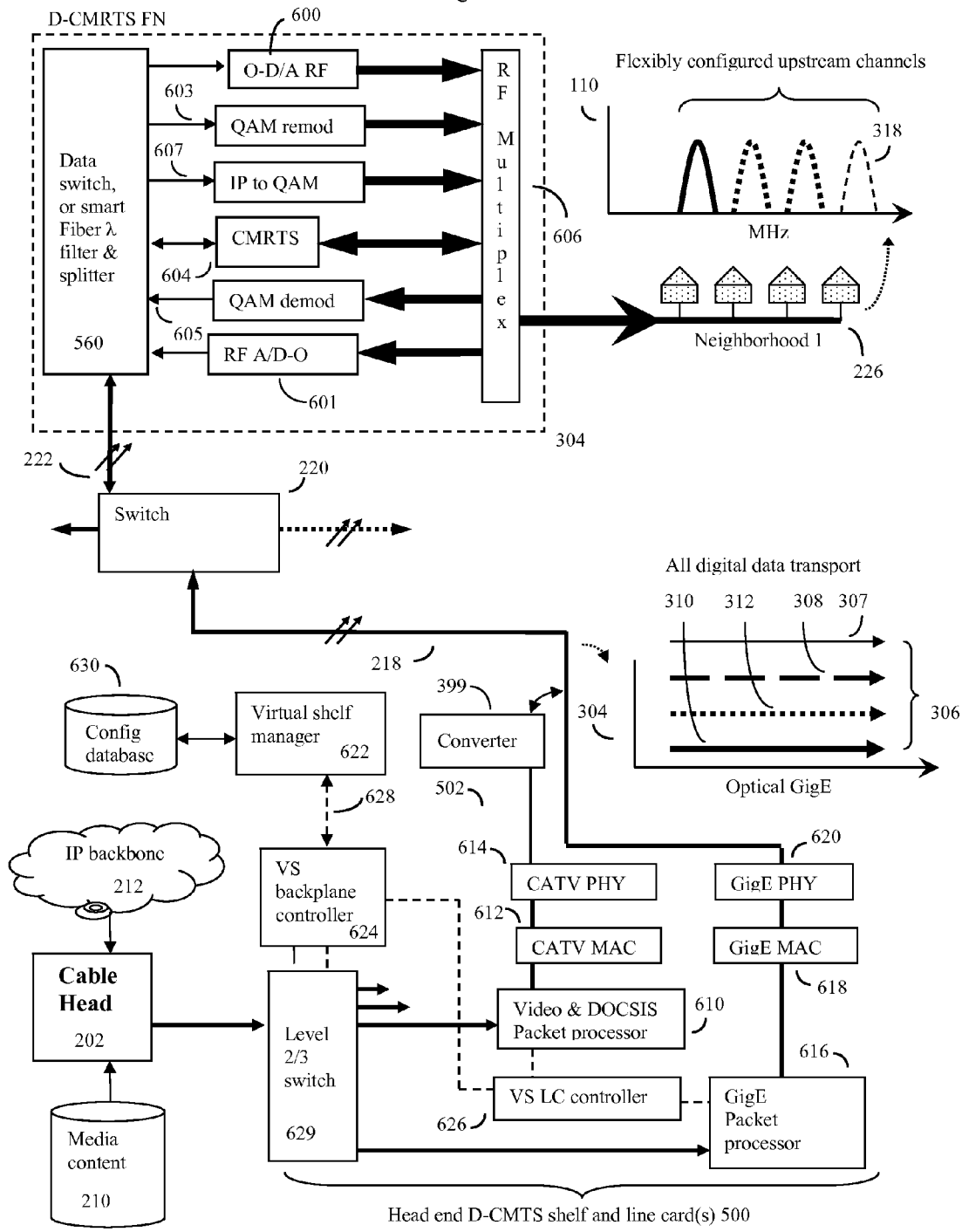
FIG. 7 shows a more detailed view showing one embodiment of how the D-CMRTS fiber nodes may operate.

Some of the examples in this specification, such as FIG. 7, show a mixed mode of operation, where some legacy "dumb" converters and optical fiber nodes in some neighborhoods work in conjunction with more advanced D-CMRTS optical fiber nodes in other neighborhoods. Other examples show a pure GigE mode where backward compatibility with dumb optical fiber nodes is no longer required.

Since the D-CMRTS units will often use optical fibers and various Digital Ethernet (GigE) protocols as their primary means of communication, this GigE fiber data will require conversion, reformatting, and QAM modulation by the components (e.g. 600, 603) in the remote D-CMRTS units (304). The QAM modulators in the D-CMRTS units will then provide a radiofrequency (RF) QAM signal that can be injected into the cable, and recognized by cable modems attached to the various cables.

As previously discussed, one of the biggest advantages of generating some or all of the CATV RF data at the local D-CMRTS optical fiber node is that vast amounts of data can be carried by the optical fiber using modulation schemes, such as the various digital GigE data transmission schemes, that may be optimized for the signal transmission characteristics of the optical fiber media. That is, by eliminating the need for direct and simple conversion to and from the signal waveforms (often QAM waveforms) used to send RF data on CATV cables, the optical fiber signals can both carry more data per wavelength, and also allow for a greater number of signals at nearby optical fiber wavelengths to be sent with minimal interference.

As per the prior Ser. No. 12/692,582 disclosure, the present disclosure also relies, in part, upon the observation that at the present level of rather coarse granularity (where multiple neighborhoods are served by the same CATV QAM signals) the aggregate demands for IP-on demand data from multiple cables serving multiple neighborhoods may easily saturate the limited CATV bandwidth. That is, absent some sort of customization, it is not possible to send all data to everybody because it won't fit on the CATV cable. However at a finer level of granularity (where each neighborhood might get its own customized CATV signal), the IP-on demand data for an individual neighborhood is more likely to fit within the limited bandwidth of each neighborhood's CATV cable.

The trick is thus to avoid overloading each neighborhood's particular CATV cable bandwidth by picking and choosing the mix of standard QAM and QAM IP/on-demand signals are delivered to each neighborhood. As per the prior Ser. No. 12/692,582 disclosure, the present disclosure's scheme of delivering a potentially ever changing mix of neighborhood specific CATV channels and data services creates some rather complex network management issues, however. Here the computer control systems previously discussed for Ser. No. 12/692,582 may be used.

The computer control system may, for example, manage the available bandwidth on the various cables that serve the various neighborhoods. When used in a backward compatible first option mode, the "standard" QAM channels (if any) that are transmitted may be fixed by the cable operator in advance, and these may remain relatively constant. When used in the less backward compatible, higher performance mode, the computerized system may vary both the "standard" QAM channels (if any) being transmitted by any given central D-CMRT line card, as well as the user-customized or "premium" IP/on-demand QAM channels being transmitted by the remote D-CMRTS units.

In CATV jargon, the various CMTS systems at the cable head are often referred to as a "shelf" or "CMTS shelf" (500). Although the invention distributes the functionality of the CMTS unit from the cable head to D-CMRTS units that may be distributed to the far-flung optical fiber nodes throughout the entire network, from a network management perspective, in some embodiments, it may be simpler for the other network equipment and software to continue to communicate with this network distributed D-CMRTS units as if it was still a single cable head CMTS (500). Thus, in one embodiment, this computer control system and software that manages the network distributed CMTS will also be called "virtual shelf" hardware and software, because the computer control system may both manage the complex configuration issues involved in running a distributed CMTS system, and then shield this complexity from the rest of the system when needed. Thus the remainder of the cable head system need not be redesigned to handle the distributed CMTS functionality, but may continue to address the invention's distributed CMTS as if it was a prior art non-distributed CMTS.

Thus, in some embodiments, the virtual shelf hardware/software system may, for example, take as inputs, user demand over multiple neighborhoods for basic TV channels and basic DOCSIS services, user demand in individual neighborhoods for advanced or premium on-demand TV or premium DOCSIS IP service (IP-on demand), and the limited number of total QAM channels that can be carried over cable.

In the first option, the virtual shelf system will simply work using whatever empty QAM channels are made available by the cable operator, and will work to optimize data to users within this overall constraint.

In the second option, in order to send still more data, the virtual shelf system may be much more active. It may, for example, elect to direct the QAM modulators in the PHY unit of a head end line card (614) to stop sending signals on one QAM channel (frequency), in order to free up this QAM channel (frequency) for a neighborhood specific QAM channel (frequency). For this invention, often this process may be taken to an extreme, and the central head end may send out no legacy QAM signals whatsoever. This frees up a maximal amount of QAM channels for subsequent neighborhood specific optimization.

In a third option, the virtual shelf system may instruct the D-CMRTS units to reallocate their neighborhood CATV spectrum or modulation scheme to allow for more upstream data to be transmitted. For example, the D-CMRTS units may work with various CATV cable connected residential gateways (See FIG. 10) to allocate a greater amount of CATV bandwidth to upstream data.

In either option, the virtual shelf system may instruct the head end GigE PHY (620) units to send neighborhood specific (IP/on-demand data) to those neighborhoods using optical fiber optimized digital data carrying waveforms, such as GigE waveforms. The virtual shelf system may then instruct the remote D-CMRTS unit on the fiber node serving the target neighborhood to take this IP/on-demand data, decode and QAM modulate the data using local CMRTS devices (604), and inject this now RF modulated QAM data on the cable for that particular neighborhood using the now empty QAM channels (frequency).

The virtual shelf system can also instruct another remote D-CMRTS unit on a different fiber node serving a different neighborhood to take the IP/on-demand data for this neighborhood from the massive amount of downstream GigE data, decode and QAM modulate this data and inject this now RF modulated QAM data on the cable for this neighborhood as well.

Note that by this method, even though both neighborhoods may optionally (for backward compatibility) receive some common legacy QAM channels and data from the head end, the overall CATV QAM channels may not be the same. Rather, at least for the IP/On-demand data, the same QAM channel (frequency) now carries different data for the two different neighborhoods.

Using these systems and methods, the effective data carrying capacity of the various cables and QAM channels has been increased. Yet, at the same time, if the centralized computer system (virtual shelf) is properly configured, most of the complexity of the switching arrangement can be selectively hidden from both the upstream (cable head) and downstream (cable modem) systems, thus enabling good backward compatibility with existing HFC equipment.

As per Ser. No. 12/692,582, in some embodiments, the system may work essentially independently of the legacy CMTS or D-CMTS units at the cable head, and will essentially act to supplement the functionality of prior art legacy equipment by adding a minimal amount of new equipment at the cable head.

Here, this new equipment at the cable head cable may consist of various digital converters (399) that convert the legacy QAM, FM, QPSK waveforms for digital output. Other equipment may consist of a media Level 2/3 switch (629), a virtual shelf management system (622, 630), and appropriate MAC and PHY devices to send and receive data along optical fibers. The legacy cable head CMTS may thus continue to operate as before (as desired), with the one exception being that the cable operator should provide for a fair number of empty CATV channels in order to provide space for the new CATV channels provided by the invention. In other words, if the cable operator saturates the various CATV cables with legacy QAM channels, then there will be insufficient CATV bandwidth available to provide much else.

In some embodiments, parts of the system may be embedded into an advanced D-CMTS (Digital Cable Modem Termination System) head (500) with at least a first packet switch, a first MAC (Media Access Control), and a first PHY (Physical Layer) that optionally may be capable of sending and receiving data from a layer 2-3 switch to a first end of a first optical fiber as at least a plurality of first digitally encoded analog QAM waveforms (first optical signals).

In some embodiments, this first PHY (614) and MAC (612) may be omitted, and instead the D-CMTS head may instead use only a second MAC (618) and a second PHY (620) capable of sending and receiving data from the layer 2-3 switch to the optical fiber.

As previously discussed, although in the preferred embodiment, all HFC optical fiber signals will be sent in a digital format, the system can still operate in a still higher backward compatible mode. Here a backward compatible wavelength, such as the standard HFC 1310 nm wavelength, may be reserved for prior art analog modulated optical fiber signals (e.g. QAM waveforms) (which may then be digitized for optical fiber transmission by a converter unit). The invention's digital signals will then operate on a different wavelength and a second head end PHY may send and receive data from the IP backbone using this alternate optical wavelength.

It will often be convenient to send both the legacy (digitized analog modulated optical fiber signals) data and the advanced data using similar digital protocols (e.g. various IP digital protocols such as GigE). This because then the same switches may be used to handle both the legacy signals and the advanced functionality signals. This is because when all data flows using the same type of digital protocol, as then simple switches can be used to send relevant data packets to the relevant destinations, and handle these data packets using the appropriate equipment once the data packets reach their intended destination.

As previously discussed, although data may be sent and received using as many optical fiber wavelengths as desired, the invention can reduce the necessity for using multiple optical fiber wavelengths, and in turn reduce costs.

If backward compatibility is desired, the D-CMRTS fiber node(s) may optionally incorporate an external "dumb" digital optical to RF (radio frequency) conversion device (see FIG. 6, 401) that directly converts the digitized versions of the prior art modulated optical signals (sent as QAM waveforms by the CMTS PHY (614) at the first end of the fiber, then digitized by a converter (399), sent over the optical fiber digitally, and then reconstituted back to copies of the original waveforms) to a first set of RF signals. These are typically designated as O-D/A-E or A-E/O-D (i.e. optical-digital to analog electronic, or analog electronic to optical digital) converters, depending upon the direction of the electrical RF to digital fiber optic conversion. Often, however this functionality will be incorporated into the D-CMRTS nodes (e.g. 600, 601, 603, and 605).

In alternate and often more expensive (but higher performance) embodiments where the D-CMRTS (300), (304) unit is designed to operate at a plurality of different optical wavelengths, the units may incorporate one or more wavelength splitting devices, such as Brag filters, prisms, gratings, and the like as part of the unit's internal switch (560), to separate and combine the various optical fiber wavelengths as desired. In some embodiments, these wavelength splitters may be tunable wavelengths splitters that may operate under software control. Although within the scope of the invention, such embodiments tend to be somewhat more expensive due to the costs of the extra equipment. Thus such multiple wavelength embodiments will typically be used more in very high (e.g. demanding) data transport situations.

The D-CMRTS may have at least one (and often a plurality of, e.g. as many as 160 or more) CATV RF signal generators, such as QAM modulator devices. These devices will be capable of detecting and encoding selected portions of the digitally encoded optical fiber data into various types of RF CATV waveforms. The device's switch (560) may, for example, be used to sort out digitally sampled legacy RF signals, and send these to a digital-optical to analog-electrical (RF) converter (600), thus producing copies of the original legacy RF signals. The switch may also be used to sort out demodulated legacy QAM signals (waveforms) which contain the underlying QAM symbols, and send these QAM symbols to QAM modulators (603), thus producing copies of the original legacy RF QAM symbols by another method. The switch may also be used to handle IP data packets from the IP backbone connected to the head end, and send these to appropriate QAM modulators (e.g. edge-QAM modulators 607 or 604). This later is particularly useful for various video on demand and DOCSIS applications.

The QAM modulator(s) may be part of a D-CMRTS PHY unit, and the D-CMRTS may often have the corresponding MAC and packet switching capability, as well as an optional controller (e.g. microprocessor and associated software) to select the appropriate portions of the digitally modulated optical signals (and wavelengths if necessary) and also control the packet switching, MAC and PHY (including the D-CMRTS QAM modulators) units as needed.

The D-CMRTS will also usually contain at least one software controllable switch that can be remotely directed to select at least some of the digitally encoded optical signals and direct the at least one D-CMRTS QAM modulator devices to encode the selected optically transmitted digital data into various of RF QAM waveforms at a selected set of frequencies (remotely generated QAM signals). Often this software controllable switch will be part of, or be controlled by, an optional processor or controller.

The D-CMRTS may also contain at least one remotely software controllable RF packet processor capable of detecting upstream data carried by CATV RF upstream signals generated by at least one cable modem, and digitally repackaging and this upstream data and digitally retransmitting this upstream data along the optical fiber.

The software controllable switch(s) and/or software controllable RF packet processor(s) may optionally be capable of being remotely configured by software to implement at least a subset of the standard DOCSIS upstream and downstream functions. For example, on the upstream side, one or more of the DOCSIS upstream Time Division Multiple Access (TDMA) and DOCSIS Synchronous Code Division Multiple Access (SCDMA) functions may be implemented. On the downstream side, one or more of the various DOCSIS QAM modulation modes, such as 16-level, 32-level, 64-level, 128-level, and 256-level QAM modulation modes may be implemented. Depending upon the level of functionality of the D-CMRTS that is desired, the D-CMRTS may, at the fiber node, generate QAM channels carrying digital broadcast video, digital video on demand, digital High Definition (HD) video, Voice data, and DOCSIS (data) channels.

As previously discussed in Ser. No. 12/692,582, the CMRTS units were disclosed as being capable of implementing additional functions that are not yet officially part of the DOCSIS specification (i.e. non-DOCSIS functionality), such as upstream data from various new models of non-DOCSIS standard set-top box gateways, may also be implemented by the D-CMRTS.

Here some of this non-standard functionality is discussed in more detail. The D-CMRTS unit may often be capable of implementing additional functions that are not yet officially part of the DOCSIS specification (i.e. non-DOCSIS functionality). This additional functionality can include ability to handle an increased amount of upstream data from various new models of non-DOCSIS standard set-top box gateways. As another example, the D-CMRTS unit may be capable of more intelligently allocating the downstream QAM channels depending upon data content need messages generated by more advanced set top boxes in various households. That is, if a household needs access to a particular video channel, for example, the household's set top box may send a command to the local D-CMRTS unit requesting this channel. This channel may already be available to the D-CMRTS unit because it has access to a vast stream of data from the optical fiber connection, but in order to preserve scarce CATV bandwidth, the local D-CMRTS unit will only allocate a CATV QAM channel for this data upon request. The D-CMRTS unit may also be capable of many other functions as well.

As another example, one persistent problem with CATV cable is that the signal attenuation properties of the RF signals vary as a function of frequency, as well as the particular characteristics of that stretch of cable. Lower frequency channels will degrade differently from higher frequency channels. It is difficult, with the present "one size fits all" scheme where all QAM channels at all frequencies are generated at the cable head, to put out a standard CATV signal where all QAM channels are modulated the same regardless of frequency. By contrast, since a D-CMRTS unit may generate some or all QAM channels locally, it is possible to use various software adjustable parameters to spectrally shape the various RF QAM waveforms to adjust for the attenuation over frequency properties of the that neighborhood's CATV cable. Thus in contrast to prior art methods, where often some of the lower or higher frequency channels have more noise, it will now be possible to ensure that all channels have low noise, regardless of the frequency of the channel.

Thus to an even greater extent than previously discussed in Ser. No. 12/692,582, the present disclosure teaches methods that enable a cable provider to distinguish itself by being able to provide cutting edge services that are ahead of its competitors. In this example, the D-CMRTS can be viewed as handling either a superset of the DOCSIS functions or a completely different set of functions, because it can be used to extend the functionality of the HFC system far beyond that of the standard DOCSIS functions.

Here the term "superset" is being used to denote the additional (non-standard DOCSIS) functionality. Thus, for example, a D-CMRTS that has enough backward compatibility to do either a full set of DOCSIS functions or a subset of DOCSIS functions would be described as implementing a DOCSIS "superset" if it also implements additional non-standard DOCSIS functions. Other examples of additional non-standard DOCSIS functionality (non-DOCSIS functionality) includes functionality to transmit various forms of digital video such as standard digital video, high definition HD digital video, and various forms of digital video upon demand.

The various D-CMRTS devices will usually have software controllable switch(s) and software controllable RF packet processor(s), and will often also incorporate their own microprocessors or microcontrollers, as well as memory (such as flash memory, ROM, RAM, or other memory storage device) to incorporate software needed to operate the switches and processors, interpret command packets sent from the virtual shelf manager, and transmit data packets to the virtual shelf manager.

For greater flexibility, the various D-CMRTS devices may be constructed using various software reconfigurable Field-programmable gate arrays (FPGA) and Digital signal processor (DSP) devices for their various MAC and PHY units, as described in more detail in copending application Ser. No. 13/555,170, "DISTRIBUTED CABLE MODEM TERMINATION SYSTEM WITH SOFTWARE RECONFIGUABLE MAC AND PHY CAPABILITY", the contents of which are incorporated herein by reference. These FPGA and DSP units may be software reconfigured to enable various types of QAM and other modulation scheme transmitters and receivers, such as filter bank transmitters and filter bank receivers. These may be constructed following the methods of Harris et. al., ("*Digital Receivers and Transmitters Using Polyphase Filter Banks for Wireless Communications*", IEEE *Transactions on Microwave Theory and Techniques*, 51(4), pages 1395-1412, 2003). Other alternative methods may also be used.

The D-CMRTS units will also often have an RF combiner device, or at least be attached to a combiner device (such as a Diplex or Multiplex device), that combines all of the various RF QAM and other CATV signals to produce a combined RF signal suitable for injection into a CATV cable connected to at least one cable modem. The diplex or multiplex device may also serve as a frequency splitter, or an adjustable frequency splitter, directing some frequency ranges (e.g. 5-42 MHz for upstream functions, and other frequency ranges (e.g. 54-870 MHz) for downstream functions. These frequency ranges may be adjusted under software control as desired.

Alternatively, this multiplex device may be external to the actual D-CMRTS unit; however the D-CMRTS unit will normally depend upon either an internal or external combiner (e.g. a diplex or multiplex device) for functionality.

As previously discussed, the system will also usually have a centralized computer system or computer processor running software (e.g. virtual shelf software) that controls many aspects of its function. As previously discussed, because the prior art (non-dispersed functionally) CMTS units were often referred to as a "shelf", the computer software that controls the functionality of the dispersed D-CMTS-D-CMRTS units of this invention will be referred to in the alternative as a "virtual shelf". This "virtual shelf" software will ideally manage the much higher complexity of the dispersed D-CMTS-D-CMRTS system in a way that will be easy to manage, and ideally sometimes almost transparent, to the cable head, so that other systems in the cable head can often handle the more complex data distribution properties of the invention's dispersed D-CMTS-D-CMRTS system as if the system behaved more like a simpler, prior art, CMTS system.

In particular, one important function of the computer processor and "virtual shelf" software will be to select and control at least the digital optical signals and the remotely generated QAM signals. These will be managed in a way that, as will be discussed, greatly increases the amount of IP-on-demand data available for cable system users.

FIG. 1 shows an overall view of the various frequencies and data channels allocated for prior art CATV systems (100). Typically the lower frequencies, such as 5-42 MHz, were allocated for use in transmitting data "upstream" from the individual cable modems back to the Cable Head (102). Typically upstream data was transmitted using a time-share TDMA (Time Division Multiple Access) manner in which individual cable modems are allocated certain times on roughly 2 MHz wide QAM channels to transmit data. Starting at around 54 MHz on up to roughly 547 MHz, space was allocated for legacy analog video channels (104), which transmit on roughly 6 MHz wide FDM channels. At frequencies above that, frequencies (space, bandwidth) was allocated for digital television transmitting on roughly 6 MHz wide QAM channels (106), and above that, space was allocated for DOCSIS services (108) that may transmit voice, on-demand video, IP, and other information, again generally as a series of 6 MHz wide QAM channels. Above about 1 GHz, cable bandwidth is and was seldom used, although future services may extend further into this region.

The invention is indifferent as to the use of higher frequency cable bandwidth and channels. If available, the invention may use them. If not available, the invention will cope with existing cable frequencies and bandwidth.

Prior art CATV cable thus had a finite bandwidth of at most about 100-200 downstream QAM channels, and a very limited upstream bandwidth. When this bandwidth is used to serve a large amount of different customized types of data to a large amount of different subscribers, this bandwidth quickly becomes exhausted. Due to the extreme constraints on upstream bandwidth, upstream bandwidth quickly became limiting.

A drawing showing how the prior art CATV spectrum allocation can be described in a more simplified diagram is shown below (110), (120). This diagram will be used in various figures to more clearly show some of the CATV spectrum allocation aspects of the invention, as well as to show how the invention may deviate from the prior art CATV spectrum allocation on occasion.

The "upstream" segment (112) is an abstraction of all prior art CATV upstream channels, including both presently used upstream channels in the 5-42 MHz region. The "video" segment (114) is an abstraction of both the almost obsolete prior art analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present or future DOCSIS channels. As commonly used in this specification, DOC1 often represents a basic set of DOCSIS services that would be made available for fallback use by neighborhoods in the event of a failure of the higher performance IP/on demand or DOC2 channels (118). The DOC1 QAM channels are normally chosen so as to not exhaust the full bandwidth of the CATV cable, so that at least some remaining QAM channels are available for the neighborhood customized DOC2 channels. The "IP/On-demand or DOC2" channel (118) is essentially (depending upon mode of use) the remaining available downstream bandwidth on the CATV cable, and is usually reserved for transmitting neighborhood specific data (IP/On-demand data), often transported by a different communications media (such as a second fiber or second wavelength, and often by a non-QAM protocol) from the cable head to individual neighborhoods.

Note that when discussing prior art usage, the sum of the DOC1 (116) and IP/On demand (118) channels sent by optical fiber to a group of neighborhoods can never (or at least should not ever to avoid interference) exceed the effective bandwidth (i.e. the carrying ability of the CATV cable and the ability of cable modems to detect the cable RF signal) of the CATV cable.

By contrast, when discussing the invention, the sum of the DOC1 (116) and IP/On-demand (118) channels sent by optical fiber to a group of neighborhoods will often exceed the effective bandwidth of the CATV cable on a group of neighborhoods basis, although the sum of DOC1 (116) and IP/On-demand (118) will never exceed the effective bandwidth of the CATV cable on a per-neighborhood basis.

If the same CATV spectrum is transmitted by optical methods (i.e. optical fiber), so that the same waveforms are transmitted at the same frequency spacing, but simply transposed to optical wavelengths, then this spectrum will be designated as (120), but the various waveforms will otherwise keep the same nomenclature to minimize confusion.

In many embodiments, the invention may intentionally deviate from this prior art CATV spectrum allocation scheme. In particular, as will be discussed, the amount of bandwidth reserved for upstream data may be substantially increased. This may be done by, for example, deviating from the traditional 4-42 MHz region reserved for upstream data, and allocating a larger number of CATV RF frequencies for upstream data.

Figure 2:
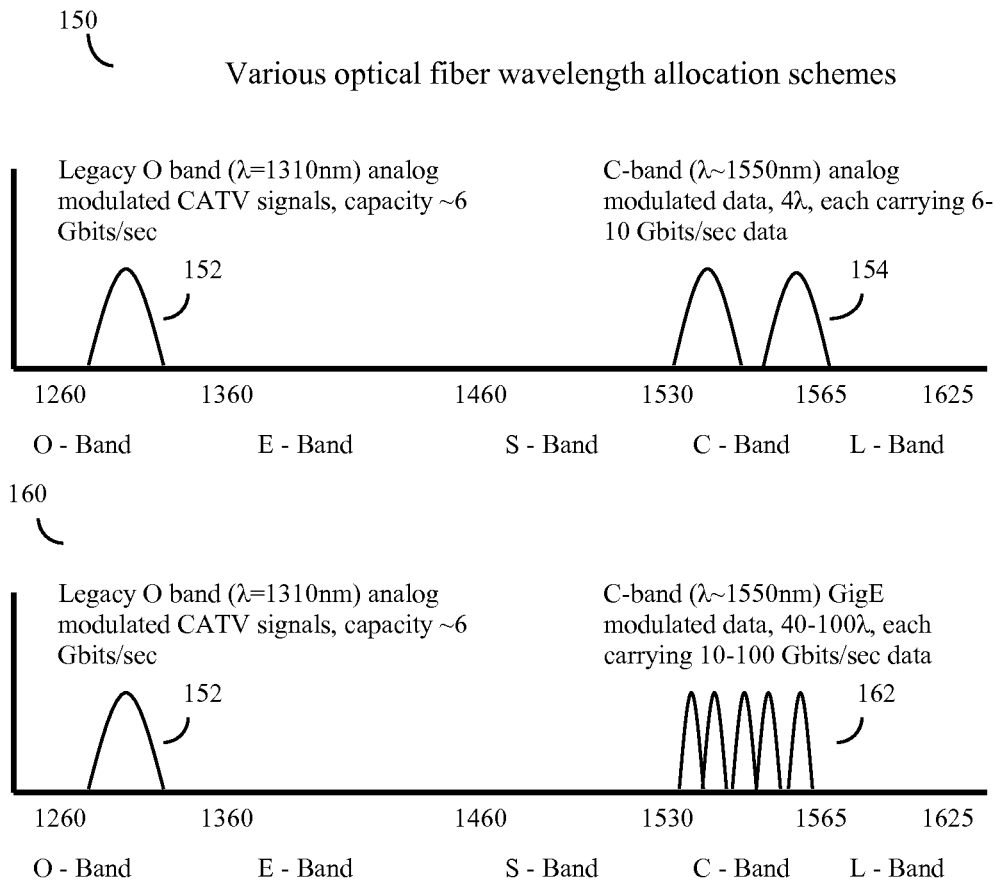
FIG. 2 shows an overall view of the various wavelengths allocated for prior art optical fiber wavelength division multiplexing schemes (150) and dense wavelength division multiplexing (DWDM) schemes (160). Although the present invention may use DWDM methods, it does not require them, and to some extent reduces the need for DWDM methods because it can fit more types of digital data onto a single wavelength using, for example, GigE optical data packets (170).
Figure 2:
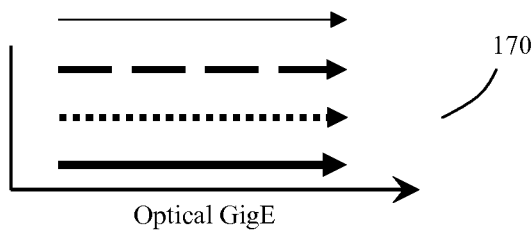

FIG. 2 shows an overall view of the various wavelengths allocated for both prior art optical fiber wavelength division multiplexing schemes, as compared to the dense wavelength division multiplexing (DWDM) methods which may optionally be used in some embodiments of the present invention. Here the optical fiber wavelengths being used at present (150) include a 1310 nm O-band wavelength (152) often used to transmit the various CATV RF channels, such as the various QAM channels, modulated essentially according to the same CATV RF waveforms, but at optical wavelengths according to scheme (120). Supplemental data is often transmitted in the C-band around 1550 nm (154), often on optical wavelengths and waveforms that, because the waveforms are modulated according to non-optimal CATV waveforms, must be separated from each other by a relatively large wavelength separation, and which carry sub-optimal amounts of data per wavelength.

By contrast, if all data is transmitted according to the same digital format, such as an IP based GigE format, then it becomes relatively simple to label any type of data as to data type and data destination, dump it in the optical fiber digital stream at the same optical wavelength (170), and then extract the digital data at the other end of the optical fiber, sort by data type and destination, and send it to the proper recipient. This all digital approach thus can have advantages over DWDM methods because the DWDM costs of producing optical modulators (e.g. optical fiber lasers) as well as demodulators, wavelength splitters, and the like, thus can be reduced.

Although the present invention, by virtue of the fact that all data will usually be transmitted digital form over the optical fiber, thus does not require use of dense wavelength division multiplexing (DWDM) methods, it is useful to briefly examine such DWDM methods because they make the advantages of the present invention's all digital approach more apparent.

The Dense Wavelength Division Multiplexing (DWDM) concept is shown in (160). Parent provisional applications 61/385,125 and 61/511,395, the contents of which are incorporated herein by reference, taught that backward compatible downstream legacy signals might be transmitted in analog form using, for example, a legacy O-band analog signal, and additional channels and services might be transmitted at multiple wavelengths using more efficiently modulated data signals (such as one of the various optical fiber GigE protocols), for example as a series of closely spaced wavelengths (162). These provisional applications also taught that due to the fact that because use of prior art QAM, NTSC, FM waveforms and the like, when used on optical fiber, is relatively inefficient, on a bits of data per unit bandwidth basis, compared to more modern digital methods of transmitting data, use of digital signal transmission methods offered compelling differences in data transmission rates.

Specifically, whereas prior QAM, NTSC, FM waveform methods might, for example, be used to transmit 4 C-band wavelengths, each carrying about 6 gigabits per second of data, using CATV compatible QAM, NTSC, FM waveforms (154), by switching to digital methods, much higher data rates, such as up to 80 wavelengths of C-band data (162), each carrying 10-100 gigabits of data per second, are possible using more efficient optical fiber signal modulation methods.

The present invention thus builds on this earlier insight, and is based on the further insight that by completely digitizing all optical fiber traffic (e.g. removing the legacy analog waveform optical fiber traffic), intelligently compressing as possible (e.g. using QAM symbol demodulation methods) and going all digital, then on a bits per second basis, much more data may be transmitted using fewer optical wavelengths, thus saving the costs of the extra equipment needed to handle the extra optical wavelengths.

Note however that the present invention still may make use of DWDM methods when, for example, extremely high data transmission rates (bits per second) are desired. However in the present invention, use of all digital optical fiber transmission is now the preferred embodiment, and use of DWDM methods is an optional element that is not required to practice the invention, although it may be.

To help visualize how switching to an all digital optical fiber transport format can help transmit more data over even a single optical fiber wavelength, the simplified digital transmission diagram (170) or (306) is frequently used. Note that a legacy O band analog modulated optical signals (152) or C band optical signals (154) can carry only at most about 6 Gigabits per second (Gbit/s), with an effective bit rate much less than this due to the inefficiencies of the analog format. By contrast, the more efficient digital format can transmit 10 Gbits/second or more at the same wavelength, and here the effective bit rate is very close to the theoretical bit rate. The net effect is that by switching to an all digital mode, the same wavelength on the optical fiber can now transmit much more data than it could earlier.

Figure 3:
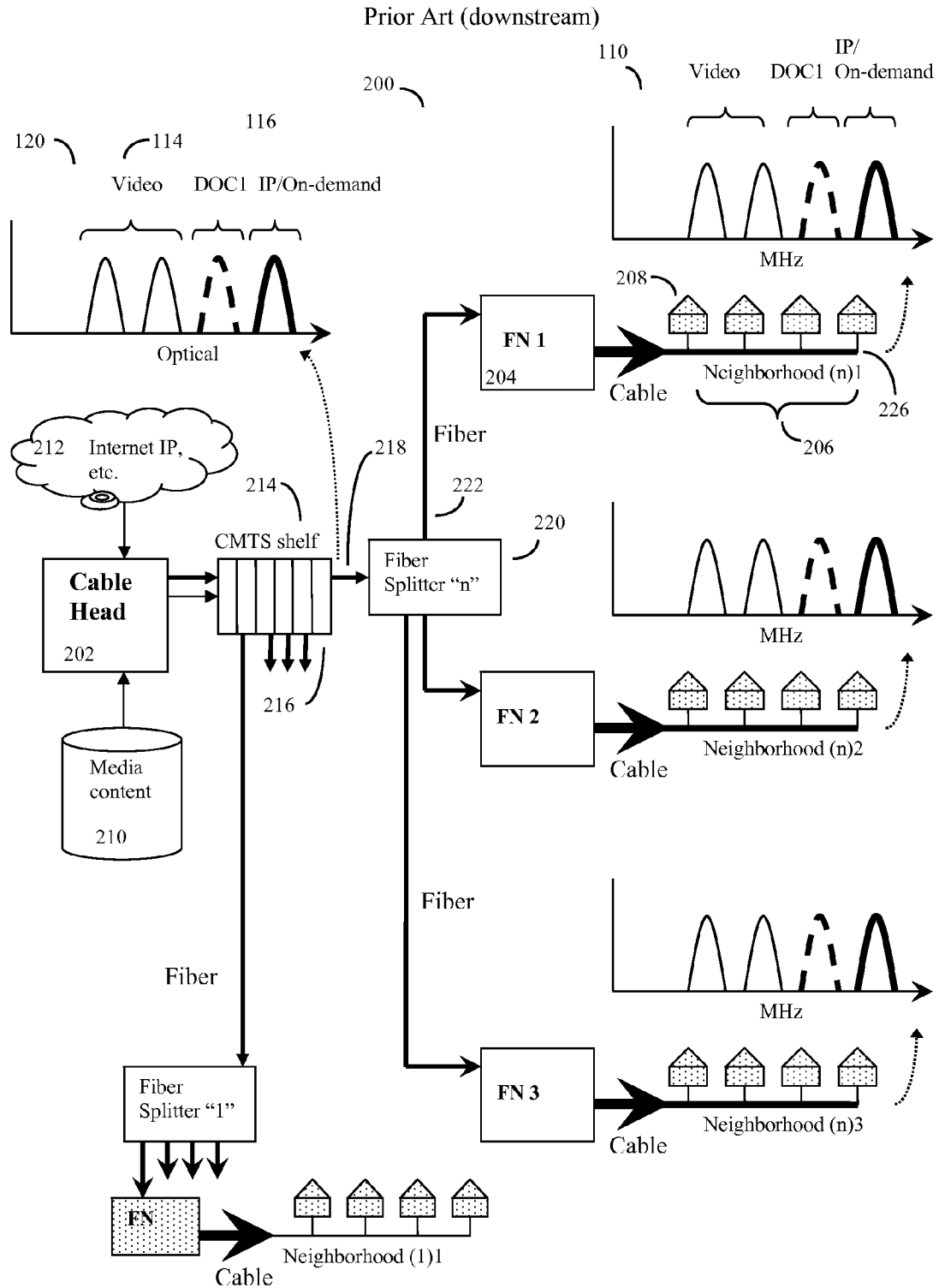
FIG. 3 shows a simplified version of how prior art HFC systems transmit data from the cable head to different optical fiber nodes serving different neighborhoods FIG. 4 contrasts the difference in downstream data transmission between a prior art HFC system that operates using a 1310 nm optical fiber infrared signal analog according to typical CATV waveforms (e.g. many QAM waveforms), and the invention's improved digital transmission methods. In contrast to prior art, because the invention can transmits all CATV data in digital form using various data packets, the higher effective data rate and superior addressing capability of IP data packets allows more different types of data to be sent on the same wavelength. The invention preserves backward compatibility by providing various converters to convert back and forth between legacy waveforms and IP data packets.

FIG. 3 shows a simplified version of how prior art HFC systems (200) transmit data from the cable head (202) to different optical fiber nodes (204) serving different neighborhoods (206). Each neighborhood will typically consist of up to several hundred different houses, apartments, offices or stores (208) (here referred to generically as "houses"), each equipped with their own cable modems (not shown). Here, for simplicity, only the downstream portion of the HFC system is shown.

The cable head will generally be connected to an IP backbone (212) and/or will obtain standardized media content (210) (such as a standard assortment of analog and digital video channels) from one set of sources, and also obtain more individualized data (212), such as video on demand, IP from the IP backbone which may include both the internet, and other individualized data from other sources. This data is compiled into a large number of different QAM (and at present also FDM) modulated CATV broadcast channels at the CTMS shelf (214). This CMTS (214) will often have a number of different blade-like line cards (216). These line cards transmit the signals by optical fibers (218) to different areas (groups of neighborhoods). Note that the FDM modulated CATV broadcast signal is an NTSC analog signal (for older style analog televisions), and even the QAM signal, although it carries digitally encoded information, is itself an analog signal as well. For historical reasons, in the downstream direction, both FDM/NTSC and QAM waveforms (signals) usually have a bandwidth of about 6 MHz in the US.

To show this, as previously discussed in FIG. 1, the FDM/NTSC and QAM signals are shown as having a center wavelength and bandwidth in order to emphasize the essentially analog nature of this signal, even when carrying digital information. These analog signals can be carried by optical fibers, and converted into RF signals for the CATV cable part of the network, using very simple and inexpensive equipment.

As previously discussed, typical HFC networks actually have a rather complex topology. Rather than sending one optical fiber from the CTMS to each different neighborhood, typically optical fibers will serve multiple neighborhoods. To do this, the signal from the CTMS side optical fiber will at least usually be split (by an optical fiber splitter (220)) into several different optical sub-fibers (222), and each sub-fiber in turn will in turn carry the signal to a different fiber optic node (fiber node, FN) (204). Here the rather complex ring topology of HFC networks will be simplified and instead represented by these fiber splitters.

At the fiber node (FN) (204), the optical signal is converted into a CATV radio frequency (RF) signal and sent via CATV cables (226) to individual cable modems at individual houses (208) in each neighborhood. Typically each neighborhood will consist of 25 to several hundred houses, served by a CATV cable (226) that connects to the local fiber node (204).

Since the CATV cable (226) is connected to all of the houses (208) in the neighborhood (206), if the cable modem in one house in a neighborhood wants to request customized on-demand video or IP, then all of the houses in the neighborhood that are attached to that particular CATV cable will actually receive the customized signal. Although only the cable modem associated with the requesting house (not shown) will actually tune into and decode the requested signal, it should be appreciated that if each individual house in the neighborhood were to simultaneously request its own customized set of video on demand or IP at the same time, the limited bandwidth of the CATV cable would be rapidly saturated. As a result, there is an upper end to the amount of customized data that can be transmitted to each house, beyond which bandwidth must be limited and/or requests for additional customized data will have to be denied.

Although the different blades or line cards (216) of the CMTS shelf (214) at the cable head (202) can send different customized IP/on-demand channels to different groups of neighborhoods, the granularity of this process is sub-optimal, because all individual neighborhoods connected to the same fiber splitter will get the same customized IP/on-demand signal. Given the limited bandwidth of the CATV cable, if all neighborhoods get the same signal, then the amount of data that can be sent to each individual neighborhood must, by necessity, be limited so as not to exceed the total available bandwidth.

Figure 4:
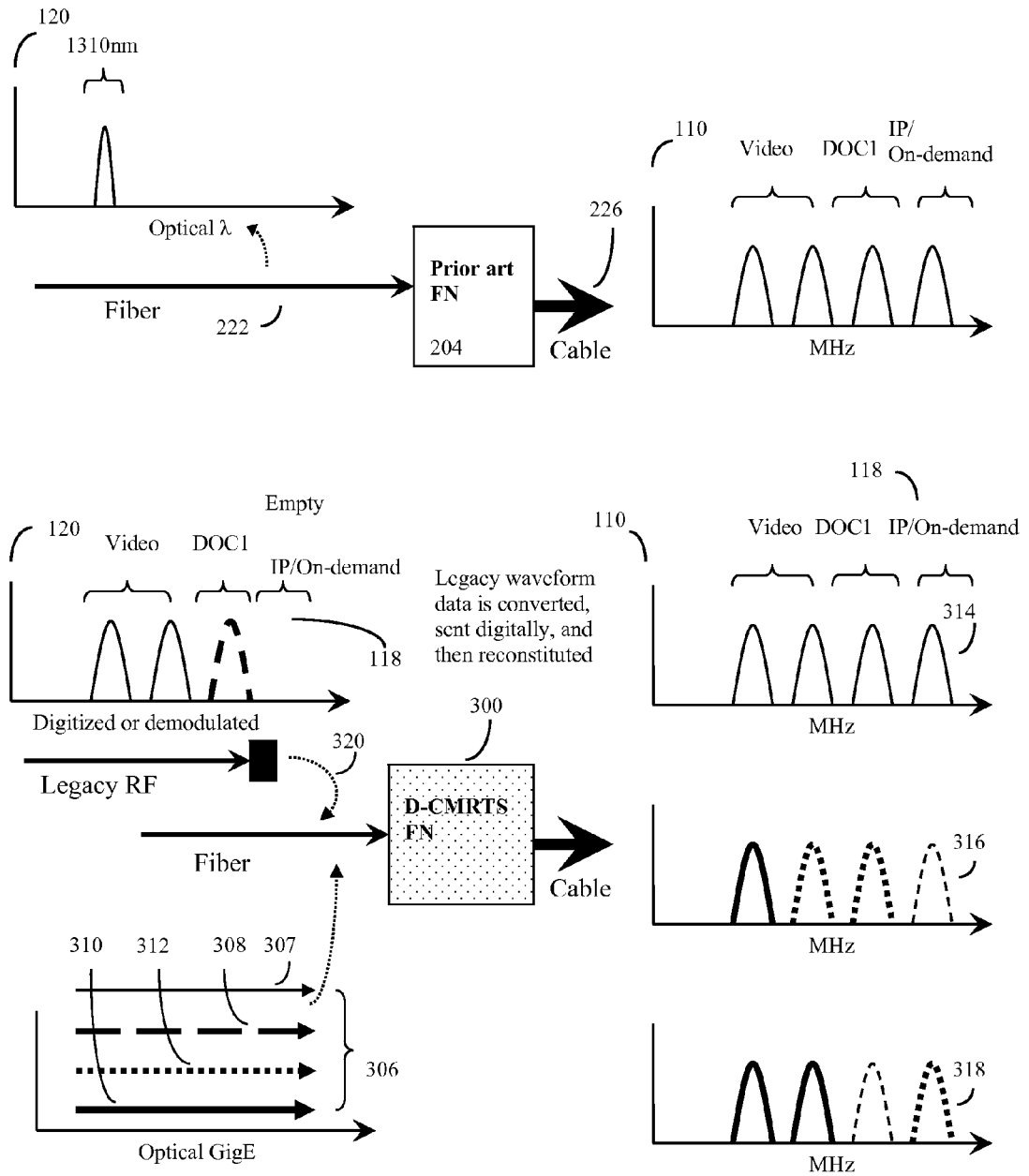

FIG. 4 contrasts the difference in downstream data transmission between a prior art HFC system that operates using an optical fiber carrying an analog CATV modulated 1310 nm wavelength signal, and the invention's improved digital methods using digital (Ethernet) modulated signals.

In the prior art system, the conversion process between the optical fiber (222) and the CATV cable (226) that occurs with a typical prior art fiber node (204) is shown, and contrasted with the invention's improved D-CMRTS fiber node (300). Here, for simplicity, only the downstream portion of the process is illustrated.

In the prior art conversion process (top), the optical fiber (222) carries both the standardized video signals, and the analog QAM signal (that contains digital information) for both digital television and DOCSIS use (that can carry on demand video or IP data).

The prior art "dumb" fiber node (204) simply converts the optical fiber's optical FDM or QAM analog signals into RF FDM or QAM signals and passes these signals to the CATV cable (226). Thus if, for example, there are four different CATV cables connecting to this different fiber node, all will get the same customized IP/On-demand signal, and this in turn may be rather inefficiently transmitted to potentially thousands of non-target households that did not request the customized signal.

By contrast, by using the invention's improved "smart" D-CMRTS fiber nodes (300), any legacy standardized signal (e.g. the standardized video channels) and (for backwards compatibility) either a full set or subset of the DOCSIS QAM channels are first digitized and transmitted by the optical fiber in a digital format. This digital format makes it easy to add additional (non-legacy) data (e.g. video on the demand, DOCSIS superset services) and transmit this additional data on the same optical fiber wavelengths used to transmit any legacy CATV data.

If legacy data is transmitted over the optical fiber, it may optionally carry a digitally encoded version of the legacy CATV spectrum, which can be reconstituted (320) into analog format at the D-CMRTS unit into RF QAM waveforms and other waveforms that may optionally be injected into the CATV cable (120) for fallback or legacy operation.

To emphasize the fact that the optical fiber is often carrying data by non-CATV-compatible or QAM signal carrying methods, the signal carried by the D-CMRTS fiber is shown as a series of lines (306) to symbolize the fact, that alternative digital (e.g. GigE) methods of signal transmission are being used. Here each line (306) represents a different type of data downstream to different node addresses or different node channels or CATV waveforms, some of which will ultimately will be converted to a QAM signal and sent to a specific neighborhood.

At the invention's improved D-CMRTS fiber node (300), the fiber node's CMRTS unit will determine (or at least select) which set of customized data carried by the various optical fiber digital packets (307, 308, 310, 312) is intended for that particular D-CMRTS and neighborhood, and retrieve this information from the fiber. This information will then be QAM modulated and converted to the appropriate RF frequency, put onto a suitable empty IP/On-demand QAM CATV cable channel (314), (316), (318), and then sent by CATV cable to the neighborhood that requested that particular data. At the neighborhood, the particular cable modem from the house that requested that data can tune into this QAM channel and extract the data, while the other cable modems also attached to that cable will ignore the QAM channel and/or ignore the data.

As can be seen, the digital data packets (306) carrying different types of data can be selected and put onto the CATV cable in various mix and match combinations (316), (318) as desired. Here for example, one RF QAM channel on (316) came from optical fiber data packet type (310), two RF QAM channels came from optical fiber data packet type (312), and one RF QAM channel came optical fiber data packet type (308). By contrast, for (318), two RF QAM channels came from optical fiber data packet type (310), one RF QAM channel came from optical fiber data packet type (308), and one RF QAM channel came from optical fiber data type (312). By contrast, (314) illustrates the CATV channel coming from a neighborhood that is operating in legacy mode, where all channels came from optical fiber data packets from digitally sampled or demodulated (320) legacy RF signals (120) that were simply transported, in digital format, as is and then reconstituted (320) back to the original waveforms at the D-CMRTS fiber node (300), or alternatively by a simpler optical digital to RF analog converter type optical fiber node.

As will be discussed shortly, this method allows for much finer granularity, and a correspondingly higher rate of transmission of customized data.

Figure 10:
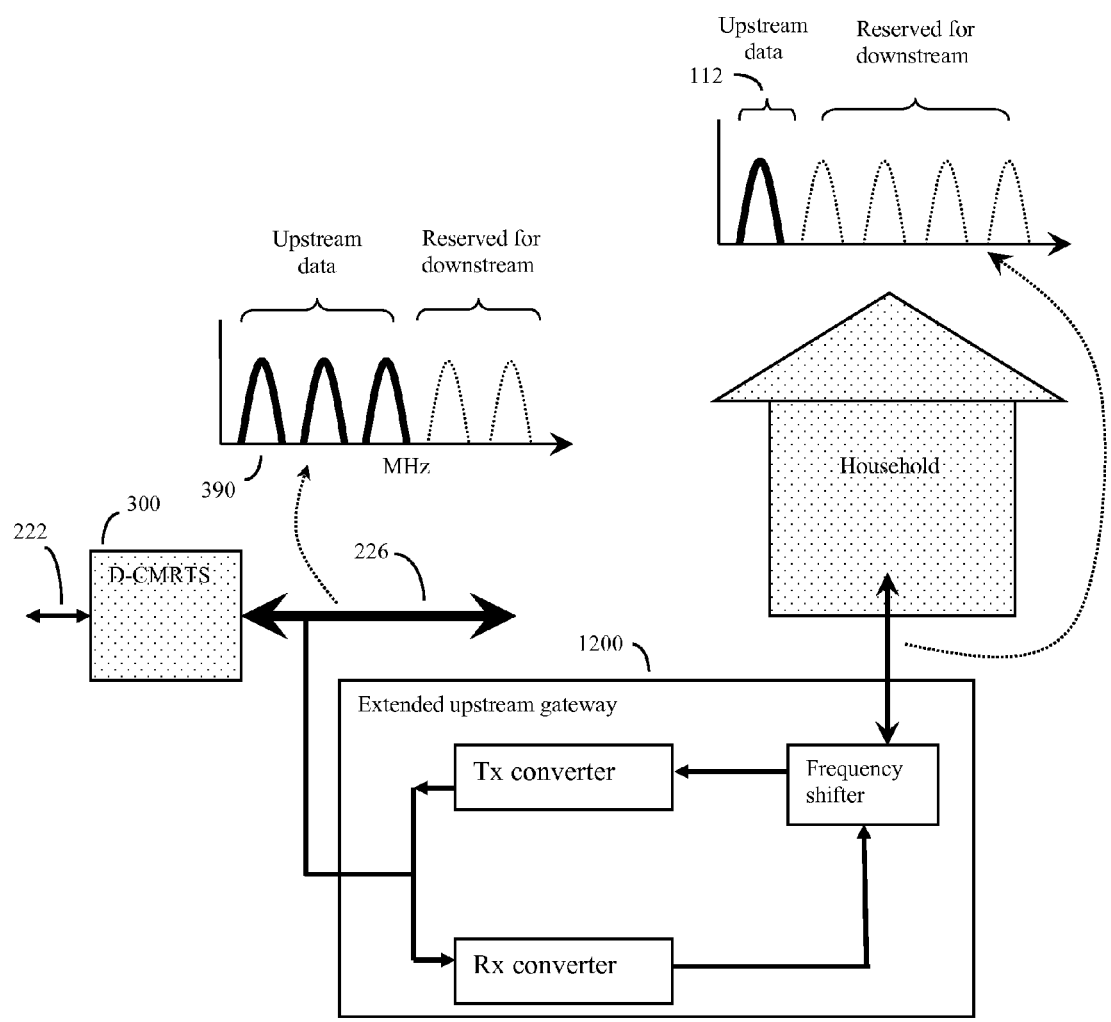
FIG. 10 shows a residential gateway (1100) that can also convert between a CATV cable system with an extended frequency allocated for upstream data (e.g. 5-547 MHz or alternative upstream range of frequencies), and residential equipment designed for the standard 5-42 MHz range of upstream frequencies.

As previously discussed, according to the invention the upstream data transmission bottleneck at the CATV cable may be also addressed by an upstream CATV bandwidth reallocation scheme (See FIG. 10, (390)). Here, the amount of CATV RF spectrum allocated to upstream data transmission may, for example, be increased—e.g. from the original 5-42 MHz range up to, for example, 5-547 MHz or other higher upper value.

Figure 5:
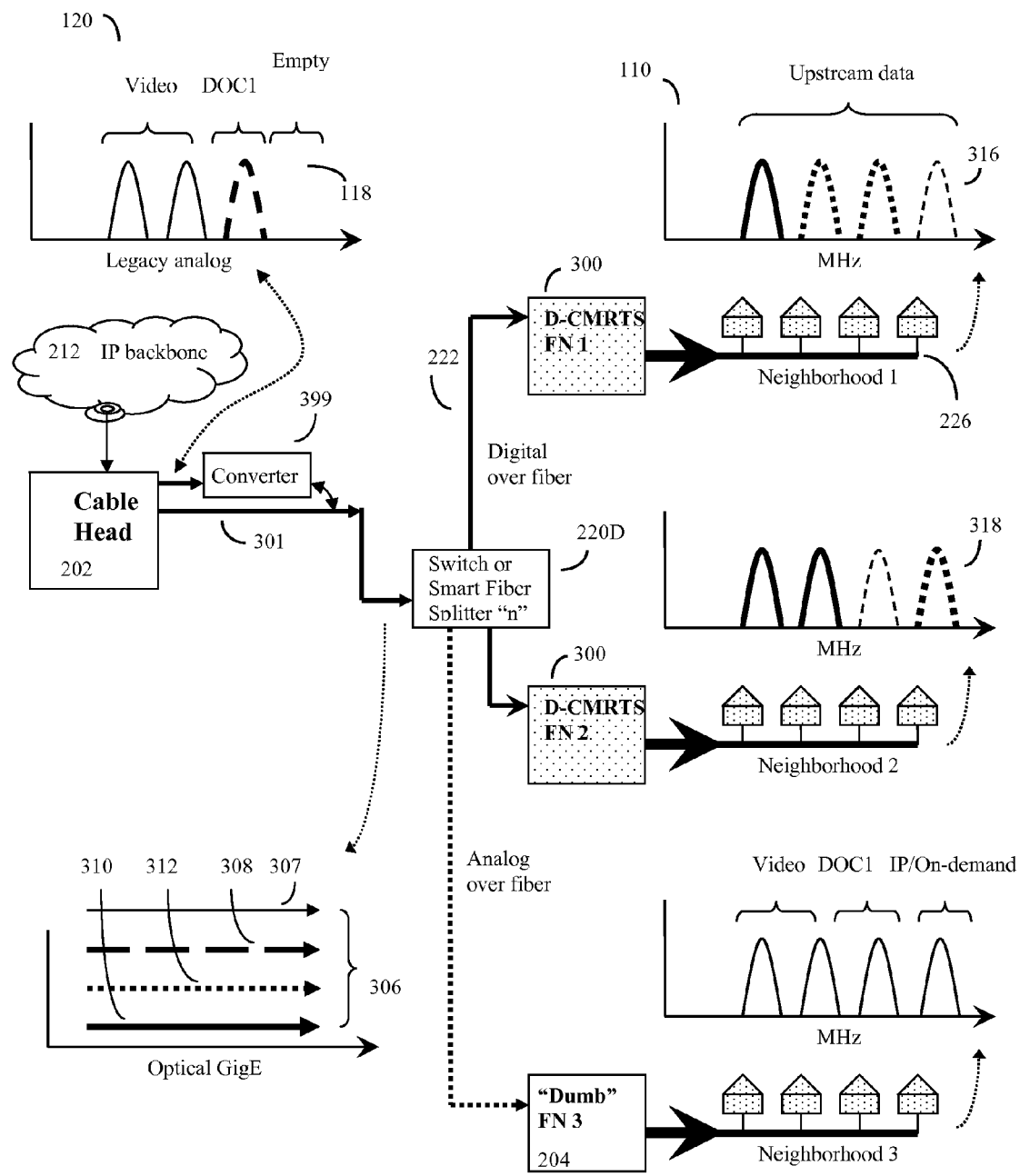
FIG. 5 shows an overview of the invention in operation in downstream mode, showing how the improved "smart" D-CMRTS fiber nodes can transport a higher effective amount of customized data downstream for users.

FIG. 5 shows an overview of one embodiment of the invention in operation in downstream mode. Here, in this embodiment, the improved "smart" D-CMRTS fiber nodes (300) can transport a higher effective amount of customized user data. Here these improved "smart" D-CMRTS fiber nodes (300), may in some embodiments, work in conjunction with optional improved D-CMTS shelf and improved D-CMTS line cards at the cable head (see FIG. 7, 500).

In this embodiment, any legacy CATV RF waveforms, such as QAM waveforms (120), produced at the head end (202) may be digitized by a converter unit (399) and then injected into the optical fiber (301). This converter unit (399) may function by, for example, being configured to accept at least one of downstream RF waveforms and downstream QAM channels from the head end, sample and digitize the downstream RF waveforms (e.g. using simple high speed analog to digital conversion) and/or demodulate the downstream QAM channels into QAM symbols, producing downstream digital QAM symbols. In this embodiment, the converter (399) is then digitally encoding the digitized legacy data into a suitable optical fiber digital transport format, such as GigE data packets, and then injecting these data packets into optical fiber (301) along with other data.

In the prior art system example previously shown in FIG. 3, an optical fiber (218) from the prior art CMTS unit (214) at the cable head was split at by a fiber splitter (220) into three sub-optical fibers (all carrying the same data) (222), and these sub-optical fibers were then routed to three different neighborhoods. Because all optical fibers coming from the fiber splitter will carry the same data, all data, including customized data, is inefficiently sent to all three neighborhoods, even though only one house from one neighborhood may have actually requested the customized data.

As a result, the limited carrying capacity (bandwidth) of the prior art CATV cable system rapidly becomes saturated.

By contrast, by using an improved head end D-CMTS shelf (500) with improved D-CMTS line cards, and the present invention's digital transmission methods, larger amounts of downstream data can be sent even while using the same number of prior art optical fiber wavelengths. Again, the key concept is to use more efficiently modulated optical fiber digital data transport protocols, such as higher data capacity GigE modulation protocols (304).

On the way to the various neighborhoods, or at the various neighborhoods, the optical fiber cable and/or CATV cable data signals may optionally pass through a digital switch (220D). Here the invention's present use of all digital transmission methods provides advantages over the previously proposed DWDM methods.

Under DWDM methods, data to different optical fiber nodes, or multiple optical fiber node devices, might be transmitted at different wavelengths, requiring that the switch (220) be a smart fiber splitter that might, for example, incorporate rather expensive optical devices, such as software controllable Brag filters, that would operate to separate out the various optical fiber wavelengths and divert them to different neighborhoods as needed.

By contrast, by using digital transport methods, digital switch (220D) can be a relatively inexpensive multiple port switch that operates to direct the various digital data packets to their respective destinations according to digital data packet headers, and the like.

To do this, typically the various DOFN or D-CMRTS units will have a processor, memory, and at least one address (e.g. the specific node address, and or one or more alternate addresses such as the address of a group of nodes, useful for when broadcasting the same signal to multiple nodes is desired). The DOFN or D-CMRTS units will typically be configured to process downstream digital data that is directed to their respective addresses.

Here, also, the IP data packets (e.g. digital samples of downstream RF waveforms, downstream digital QAM symbols, or downstream digital IP data) transmitted over the optical fiber will often have a specific (e.g. individual node or group of nodes) digital optical fiber node address.

In some embodiments, digital switch (220D) may be a multiple port switch disposed either at the head end or else somewhere between the head end and the various digital optical fiber nodes (D-CMRTS units). This switch (220D) can thus be configured to read the specific digital optical fiber node or D-CMRTS addresses; and direct any of the various digital samples of downstream RF waveforms, downstream digital QAM symbols, or downstream digital IP data to the specific digital optical fiber node or nodes corresponding to their specific digital optical fiber node address, be it individual node address, or specific group of nodes address.

Here, use of all digital methods also helps cost reduce the various D-CMRTS. Whereas under the prior DWDM scheme, the various D-CMRTS units themselves may have extracted data from multiple optical fiber wavelengths through us of more expensive wavelength splitters (such as software controllable Brag filters), use of digital data packets makes use of such wavelength splitters optional. Under the present all digital scheme, the various D-CMRTS units can essentially pick and choose what GigE formatted data they may need from the overall digital data packet stream (306, 307, 308, 310, 312) extract this data, reconstitute, remodulate, or QAM modulate the various data types, and then output CATV RF signals (again often QAM channels) that can be a composite of the data originally carried on the different digital data streams (307, 308, 310, 312).

This "mix and match" process is symbolized by the various dark, dashed, and dotted parabolas shown in (316) and (318), which symbolize the CATV RF modulated data that is being output in neighborhood 1 and neighborhood 2 by D-CMRTS Fiber Node 1 and DCMRTS Fiber Node 2. Here for example, as before, the downstream CATV data (226), (316) on neighborhood 1 is shown as a mix of dark parabolas (data originally obtained from fiber digital data packets (310), a mix of dashed parabolas (data originally obtained from fiber digital data packets 308), and dark dotted parabolas (data originally obtained from fiber digital data packets 312). Note that the mix of data for neighborhood 2 (318) is different from neighborhood 1. Whereas neighborhood 1 only took a small amount of data (dark parabola) from fiber digital data packets (310), and a larger amount of data (two dark dotted parabola) from fiber digital data packets (312), here the D-CMRTS unit (300) for neighborhood 2 has selected more data (two dark parabolas) from fiber digital data packets (310), and less data from (one dark dotted parabola) from fiber digital data packets (310).

Note also that the D-CMRTS unit has freedom to decide what frequencies will be used to transmit this data over the CATV cables. Here the D-CMRTS units determine what data to place on the neighborhood CATV cables based upon commands sent upstream by the various household devices attached to the CATV cable, and/or commands sent from the cable head. As previously discussed, often the D-CMRTS optical fiber nodes will be software controlled.

Due to this software controllable, neighborhood specific (or at least neighborhood region specific) ability to combine and repackage huge amounts of GigE formatted data carried over a large number of optical fiber channels, the downstream capability of the system can now be substantially higher than prior art HFC systems.

Note also that some backward compatibility can be preserved, if desired. Here, for example, fiber digital data packets (307) can still be used to digitally transmit the legacy CATV RF signals, such as QAM signals. This can be done by having converter (399) intercept the legacy signals, digitize them by a relatively "dumb" Analog-RF to Digital Optical units, or by demodulating the QAM waveforms, extracting the QAM symbols, and then transmitting the QAM symbols in a digital format.

These digitized legacy signals can continue to be sent to "dumb" optical fiber nodes (204), and the digital optical data reconstituted (e.g. by optical-digital to analog-RF units, or by feeding the digital QAM symbols into local QAM modulators). Both operations can be done with minimal onboard intelligence at the optical fiber node, hence the "dumb" label. This "dumb" optical fiber In FIG. 5, neighborhoods 1 and 2 are served by the invention's improved "smart" D-CMRTS fiber nodes (300). By contrast, neighborhood 3 is only served by a "dumb" fiber node (204).

Figure 6:
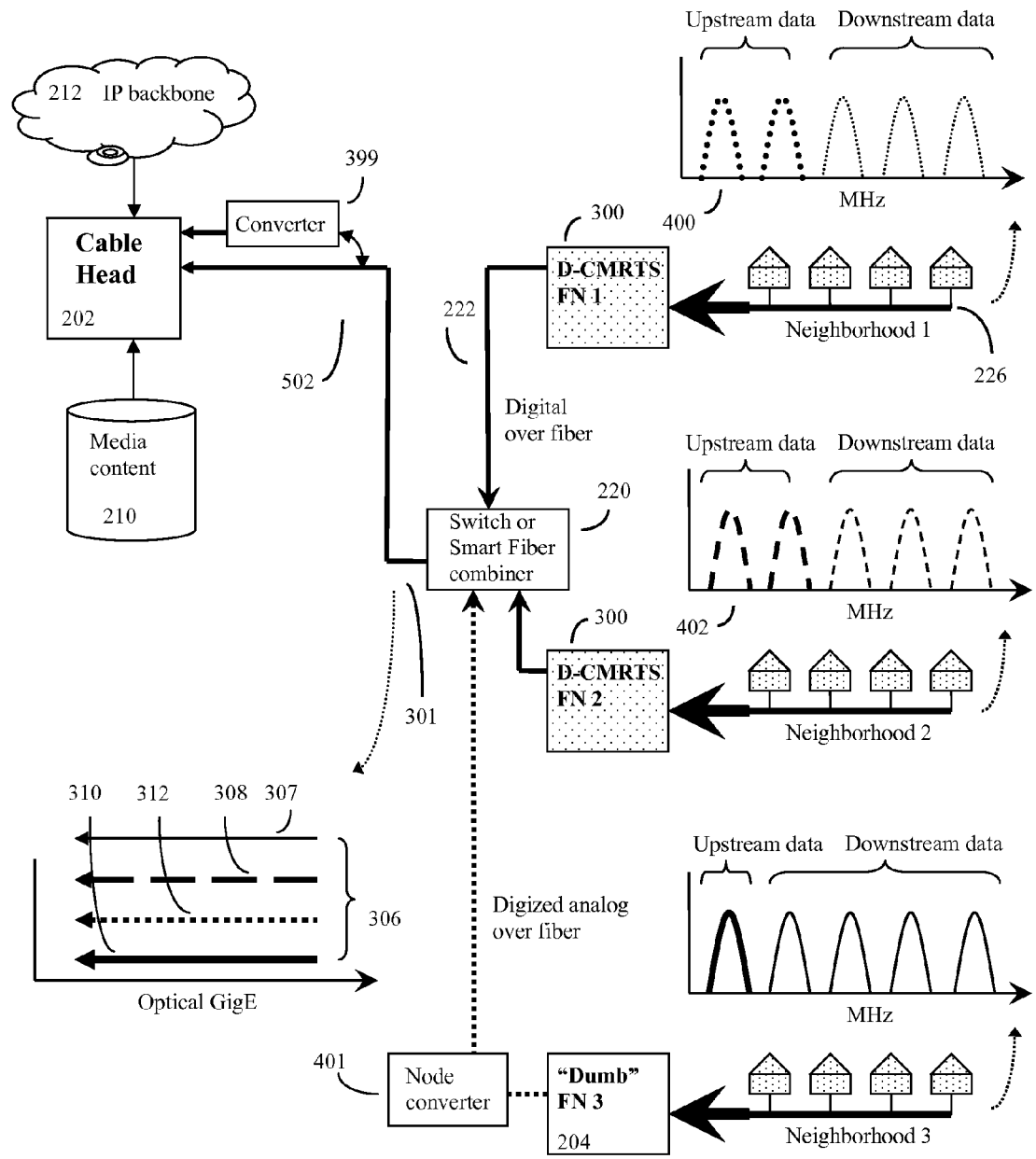
FIG. 6 shows how the invention may also reparation the CATV upstream/downstream frequency split from the standard (US) 5-42 MHz upstream frequency range, into an alternate and often broader upstream frequency range. This helps the system transmit a far greater amount of upstream data from local neighborhoods to the cable head.

FIG. 6 shows one embodiment of the invention operating to send data upstream. As previously discussed, at the CATV cable, considerably more upstream data can be sent due to the previously discussed (but optional) methods of allocating more CATV bandwidth for upstream data (e.g. using spectrum reallocation). Because spectrum reallocation is easier to draw, this larger amount of upstream data being transmitted along the CATV cable is symbolized here by the two dark dotted or dashed parabolas labeled "upstream data" for neighborhoods 1 and 2, showing the higher amounts of upstream spectrum. By contrast, the smaller amount of upstream data that can be transmitted using prior art methods is symbolized by the one dark parabola labeled "upstream data" for neighborhood 3. Here for example, perhaps neighborhood 3 is using the standard US CATV upstream partition that allocates 5-42 MHz for upstream data, while neighborhoods 1 and 2 are using an alternate scheme such as allocating 5-85 MHz for CATV upstream data. Here for example, RF multiplexer or diplex (606) can be switched into an alternate mode that deviates from the present 5-42 MHz upstream and 54-870 MHz downstream standards, and instead allocates the 5-85 MHz region for upstream, and for example the 92-870 MHz region for downstream.

As previously discussed, if the higher amount of upstream data was simply transmitted back along the optical fiber system using the same inefficient (for optical fiber) CATV signal modulation scheme (again usually QAM modulation), then the optical fiber itself would rapidly become a rate-limiting bottleneck. To avoid this problem, according to the invention, the D-CMRTS nodes may extract this upstream data, and repackage it into more efficiently (for optical fiber) modulated GigE formats. Additionally or alternatively, according to the invention, digital switches (220D) or smart fiber combiners (220) may themselves take the upstream data sent by the optical fibers (222) connecting various neighborhoods, and extract the upstream data and repackage the upstream data in a more efficiently modulated (for optical fiber) GigE format.

Although much of the upstream content consists of relatively standard QAM waveforms, at least some legacy CATV systems can also provide a variety of unusual upstream RF waveforms, such as various QPSK channels from various older set top boxes, and the like. However it is burdensome to try to parse each and every possible upstream waveform for content. To avoid this burden, here again more general methods that simply digitize whatever waveform is seen can be useful.

Thus to be able to digitize, and optically transport upstream, a possibly wide variety of possible RF CATV waveforms, while at the same time trying to conserve optical fiber bandwidth where feasible, in some embodiments, the digital optical fiber node (D-CMRTS unit) will additionally have at least one of:
1: An RF digital converter device configured to accept upstream RF waveforms transmitted over the CATV cable, and digitize these upstream RF waveforms using, for example, a high speed analog to digital converter, and produce digitally encoded upstream RF channel data.
2: Since many upstream RF signals will be QAM waveforms, for optical fiber bandwidth efficiency purpose, it is often desirable to also have an RF demodulator device configured to accept upstream RF QAM channels transmitted over the CATV cable, and demodulate the RF QAM channels and produce the upstream digital QAM symbols that originally were used to construct the various upstream QAM waveforms.
3: Additionally, for high performance, it is also often desirable to have a QAM to IP conversion device configured to accept upstream digital IP data packets transmitted by the upstream QAM RF channels over the CATV cable, and extract said upstream digital IP data packets, thus producing upstream digital IP packets.

Once this digital data has been produced, the digital optical fiber node or D-CMRTS unit will also often have a digital data to optical converter device configured to combine any of these digitally encoded upstream RF channel data, upstream digital QAM symbols, and upstream digital IP packets and transmit this data, symbols, and packets digitally upstream over the optical fiber.

More specifically, note that the D-CMRTS units themselves may, in some embodiments, use relatively simple digitization methods, such as RF-analog to optical-digital converters, or QAM demodulators, to extract upstream CATV RF signals, digitize them, and transmit them in a fiber digital format such as GigE back to the head end. Here again, by simply giving the data packets an appropriate label or header, it is relatively simple to aggregate data from many D-CMRTS units, and send them all back upstream on the same optical fiber channel (as desired), again both increasing upstream data handing capability and also saving costs over alternative methods.

Thus in FIG. 6, the large amount of upstream data from neighborhood 1 (400, dark dotted parabolas) and the large amount of upstream data from neighborhood 2 (402, dark dashed parabolas), could in alternative schemes have originally been sent upstream along optical fiber (222) by D-CMRTS Fiber Node 1 and D-CMRTS Fiber Node 2 (300) at various different optical fiber wavelengths to avoid interference.

However, since, according to the invention the D-CMRTS units may have either repackaged and remodulated this upstream data into a more efficient more optical fiber transmission GigE format, this data from different neighborhoods may instead be sent back using the same optical fiber wavelength (if this option is desired, which it often may be because it is cheaper).

Note that although this disclosure has focused on the all digital optical fiber transmission aspects of the invention, this focus should not be intended to exclude the fact that analog optical fiber transmissions may also co-exist along optical fiber (222).

Consider the case for neighborhood 3. In some schemes the D-CMTRS units or a prior art dumb fiber node (204) may simply and relatively passively, have transuded the upstream CATV RF waveforms from RF to optical signals such as infrared optical signals, and then retransmitted the upstream data otherwise modulated "as is".

Although this option is not excluded, in a preferred embodiment, the dumb optical fiber node (204) may either be replaced by a dumb digital converter optical fiber node that does little more than digitize the upstream CATV RF signal (e.g. using a module such as 601 or 605), and transmit this digital data upstream on optical fiber (222) according to standard optical fiber digital formats. As yet another embodiment, the prior art dumb optical fiber node (204) may be retained, but a digital node converter unit (401) may be put in place to convert optical fiber signals back and forth between a digital format and a legacy analog format for the legacy dumb optical fiber node (204). Here, this node converter unit (401) may, in some embodiments, essentially do the same type of data repackaging and remodulation functions of previous switch (220) previously discussed in parent provisional applications 61/385,125 and 61/511,395, the contents of which are incorporated herein by reference.

In the present disclosure, switch (220) is instead operating as a multi port digital data switch (220D), which may operate at either one wavelength or a plurality of wavelengths as desired, and the data extraction, digitization or reconstitution functions, and analog format to digital data packet repacking functions may instead be moved to other devices such as converters (399) and (401).

For example, in this scheme, the upstream data from neighborhood 1 (dark dotted parabolas) and the upstream data from neighborhood 2 (dark dashed parabolas) has been digitized and repackaged by the D-CMRTS units (200) into various digital data packets.

Without such digital conversion, the two upstream data sources may have been originally sent by the various D-CMRTS units on different optical wavelengths. But because the data has now been repackaged at the D-CMRTS units, now the data from both neighborhoods can be carried upstream on optical fiber digital data streams (308) and (312) at the same wavelength along optical fiber (301).

FIG. 7 shows a more detailed view of how the D-CMRTS fiber nodes (300), converters (399) and improved digital cable modem termination systems (D-CMTS) (500) at the cable head with improved D-CMTS line cards, may operate.

For simplicity, again primarily the downstream portion of the system is shown. Generally the D-CMRTS units will have an onboard digital data switch (560) (operating either with optical fiber digital data packets, the electrical version of these optical fiber digital data packets) used to direct various optical fiber data packets to and from their correct destination devices (e.g. 600, 601, 603, 604, 605, 607) inside the D-CMRTS.

Although a capability of operating at multiple optical wavelengths is not required, in an alternative embodiment where operating with a plurality of optical fiber wavelengths is desired, then the switch (560) may optionally also include optical fiber wavelength splitters, such as one or more Brag filters or other device, to separate out the various wavelengths. These optical fiber wavelength splitters may optionally be a "smart" or tunable filter that may select different wavelengths under microprocessor and software control. The different wavelengths selected by this splitter may then be sent to various subsystems, such as CMRTS units (604), which can extract the digital data, repackage it, and generate CATV QAM signals and/or other RF signals for the CATV cable.

For backward compatibility, the D-CMRTS fiber nodes (300), (304) may also have one or more simple optical-digital to analog RF (O-D/A-RF) (600) converters to convert any digitized legacy downstream optical fiber data, which may contain analog to digital sampled versions of various CATV NTSC, FM, QPSK, or even QAM waveforms back from digital data packets to their respective analog RF waveforms again. Depending on the embodiment, (O-D/A-RF) converters may work directly on downstream optical data, or alternatively work on electrical equivalents of the downstream optical data signals.

The D-CMRTS fiber nodes may additionally contain the reverse upstream versions of these units (601). These upstream units will take selected upstream RF signals from the CATV cable, such as set top box QPSK channels or even DOCSIS upstream channels as needed, do an analog to digital conversion, fit into data packets, and optionally either transduce into upstream optical data packets, or allow a later stage device such as switch (560) to transduce into upstream optical data packets to send back to the head end.

Also for backward compatibility, the D-CMRTS fiber nodes (300), (304) may also have one or more QAM remodulator devices (603) to take demodulated QAM symbols from the downstream optical data packets, and convert these back into RF QAM waveforms carrying the same data payload, and then send downstream on the CATV system via diplex or RF demodulator (606). Again depending on the embodiment, these QAM remodulator devices may work directly on optical data, or alternatively work on electrical equivalents of the optical data signals.

These QAM remodulator devices may additionally contain the reverse upstream RF QAM demodulator versions of these units (605). These upstream QAM demodulator units may take selected upstream QAM RF signals from the CATV cable, such as various legacy DOCSIS upstream QAM channels as needed, demodulate the RF QAM waveforms to extract the underlying QAM symbols that generated the waveforms, fit these demodulated upstream QAM symbols into data packets, and optionally either transduce these QAM symbols into upstream QAM symbol optical data packets, or allow a later stage device such as switch (560) to transduce into upstream QAM symbol optical data packets to send back to the head end.

The D-CMRTS units may additionally contain one or more optical data packets (e.g. optical IP data packets) to RF QAM waveform converters (607). These IP to QAM converters are useful for, example, converting legacy broadcast QAM channels from the head end that have been demodulated at the head end and packaged into optical data packets for more compact (e.g. lower bandwidth needed) transport over the optical fiber than would be possible than if the entire legacy head end analog QAM channel waveforms had instead been transposed to equivalent optical QAM waveforms. In some embodiments (not shown), the D-CMRTS units may also contain the reverse version of these units that takes upstream QAM RF data, demodulates it, repackages the upstream QAM symbols into IP data packets for optical upstream transmission.

The D-CMRTS fiber node (304) will also contain one or more CMRTS units (604) that will select at least some of the GigE formatted data (310), (310), (307) from the optical fiber (222) QAM modulate this data, and send it to the CATV cable. (226) according to the scheme previously discussed in FIG. 4. The CMRTS (604) portion of the D-CMRTS unit (304) may in some embodiments generally function as previously discussed in copending application Ser. No. 12/692, 582, the contents of which are incorporated herein by reference.

It should be appreciated that this mix and match system will impose a considerable configuration and management problem on the D-CMTS units at the cable head (202). As previously discussed in parent application Ser. No. 12/692, 582 and also in the present specification, this complexity may be handled by a computerized network management system and software termed the "virtual shelf".

In one embodiment of the improved "virtual shelf" system, the D-CMTS shelf and improved D-CMTS line cards may optionally be configured with both packet processors (610), and MAC (612) and PHY (614) devices or functionality to transmit standard CATV analog, QAM, NTSC, QPSK, and DOCSIS analog signals, where the signals may be digitized by converter (399) and transported over the optical fiber as a series of legacy optical IP data packets (307).

The same CMTS shelf and line cards may also be configured with packet processors (616), MAC (618) and PHY (620) functionality to some or all of this data as GigE formatted data as various digital optical IP data streams (e.g. 308, 310, 312) on one or optical fiber wavelengths.

As a result, the MAC (618) and PHY (620) for (308, 310, 312) can be different from the MAC (612) and PHY (614) used for the optical fiber IP data packets for the legacy signals (307).

The exact mix of signals transmitted and received by the improved line card will vary depending upon what sort of fiber nodes are connected downstream (southern end) to the line card.

For example, if all of the fiber nodes were "dumb" prior art fiber nodes (204), then the D-CMTS line card may only transmit legacy digitized optical IP data packets (307), and after passing through converter (399) the functionality of that particular D-CMTS line card could be backward compatible with prior art CATV DOCSIS equipment and fiber nodes.

That is, the optical fiber legacy IP data stream (307) could transmit the full set of DOCSIS channels, simply by brute force analog to digital, digital optical transmission, and digital to analog conversion; and/or brute force QAM demodulation into QAM symbols, digital optical transmission, and QAM symbol remodulation back into QAM waveform methods.

By contrast, if all of the fiber nodes were "smart" improved D-CMRTS fiber nodes (300), then the improved head end D-CMTS and CMRTS line card might elect to maximize all or nearly all data to the various households by skipping legacy mode, just sending all data via the non legacy optical IP data packets (308, 310, 312) one or more wavelengths in an optical digital transport protocol such as GigE format, and leave it to the D-CMRTS units (300), (304) to then handle the reformatting and conversion to CATV RF modulation schemes such as QAM modulation.

This scheme would thus allow the highest amount of customized data to be sent to the houses on that particular stretch of cable.

In a mixed mode HFC system using a mix of "dumb" fiber nodes (204) and "smart" CMRTS fiber nodes (300) (as previously shown in FIG. 5), the improved D-CMTS and D-CMTS line cards could ideally elect to operate in both legacy and GigE modes, thus transmitting and receiving standard video channels (114) and DOCSIS (116) information to and from neighborhood 3 (served by the "dumb" fiber node), using the digital converter (399), optical node converter (401), and the legacy optical fiber digital IP packet data stream (307) to continue giving adequate service to neighborhood 3.

As previously discussed, in order to manage this complexity, the functionality of the improved head end D-CMTS and D-CMTS line cards, as well as usually the functionality of the D-CMRTS fiber nodes (300), may be extended by use of additional "virtual shelf" network management computers, controllers, and software.

In one embodiment, a unified network management system (exemplified by, for example, the ConfD management system provided by Tail-f incorporated) is added to the improved D-CMTS and line card to unify the network and D-CMTS hardware and virtualization layer, provide operating system services, manage middleware, and configure the system to use the proper networking protocols. In this embodiment, all or at least much network configuration data is stored on a database in the D-CMTS manager, and the configuration of the network is controlled by a process in which the management software (ConfD) communicates over IPC (sockets) with apps that control the function of various packet processors, MAC, and PHY devices on the improved D-CMTS and D-CMRTS units.

Here the a computer or processor and associated software memory (622) are shown directly controlling the operation of an improved D-CMTS unit by way of various other controllers (624), (626) located in the improved D-CMTS backbone and line cards (500). The communications between this "virtual shelf manager" (622) and the local controller processors (624), (626) are shown as dashed lines (628). The virtual shelf manager may also control the operation of a level 2/3 switch (629) and/or other devices that connect the improved D-CMTS unit to the media content (210), IP backbone "cloud" (212), and other services provided by the cable head (202).

The virtual shelf manager may often also manage the configuration of the various "smart" D-CMRTS fiber nodes (300), often by communicating with controllers and applications software embedded with the D-CMRTS fiber nodes (not shown). Given the typically long distances between the D-CMRTS fiber nodes (300) and the virtual shelf manager (622) and improved D-CMRT (500) (which will often be located at the cable head, miles or more away from the various nodes (300)), the D-CMRTS fiber node (300) to virtual shelf manager (622) communication will often be done by various signals and signal protocols communicated by the optical fiber or fibers. In one preferred embodiment, socket based inter-process communication (IPC) protocols are used.

This enables the configuration of the D-CMTS shelf, and indeed the overall network, to be rapidly reconfigured to meet the ever changing network model generated by the invention. Often it will be convenient to store this network configuration, as well as the properties of the various network devices, in a configuration database (630) and configuration database memory device (not shown).

Figure 8:
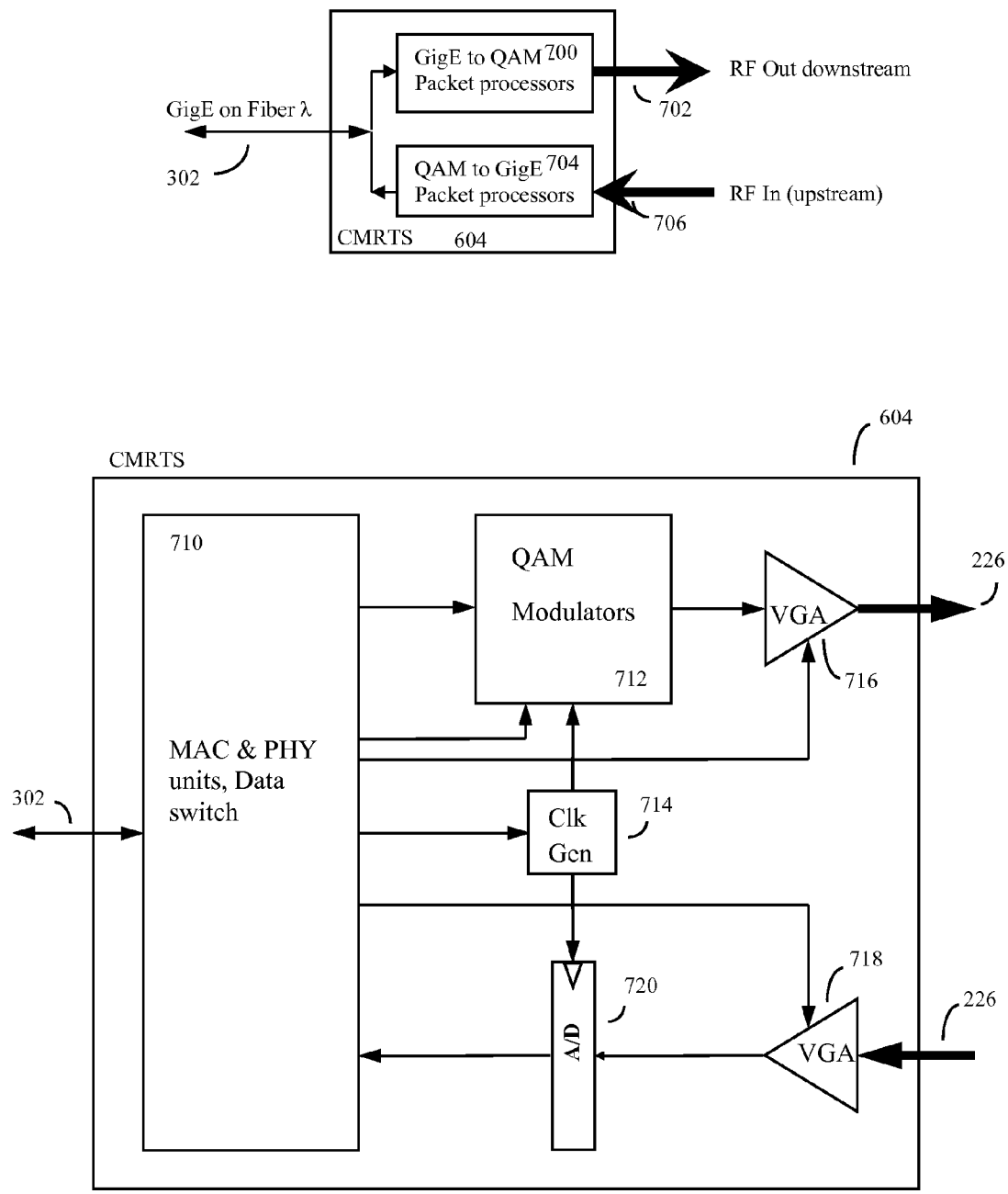
FIG. 8 shows additional details of how the CMRTS portion of the D-CMRTS fiber node may operate. The CMRTS portion provides much of the higher functionality of the system.

FIG. 8 shows more details of the Cable Modem Remote Termination System CMRTS (604) portion of the D-CMRTS fiber node. At a higher or at least alternate level of abstraction, the CMRTS portion of the D-CMRTS fiber node may typically comprise at least a first set of QAM-RF packet processors (700) with MAC and PHY units that select the desired optical IP downstream data from the GigE formatted data, and convert the downstream optical IP packet data to a plurality of radiofrequency (RF) QAM waveforms (channels) and output this data downstream (702) to the local CATV cable.

This CMRTS unit (604) may also optionally comprise a second set of RF-upstream packet processors (704) that will read the upstream RF signals (data) sent by cable modems connected to the local CATV cable (706). Note that these packet processors (704) may contain MAC and PHY units that are capable of recognizing the upstream data. Thus if the upstream data is sent using an unusually wide upstream bandwidth according to scheme (390), the MAC and PHY units will recognize it. The units will then convert this upstream data to appropriate optical IP Ethernet data packets, or other digital optical data communications protocols suitable for communicating this cable modem data back upstream to the improved D-CMTS (500) at the cable head.

The operation of both packet processors (700), (704) as well as other devices such as O-D/A-RF or RF-A/D-O converters (600), (601), QAM remodulators and demodulators (603), (605), CMRTS unit (604) and the like may be remotely controlled by the virtual shelf manager (622) by way of suitable controllers (often microprocessors), and local applications software (Apps) that intercept data from the optical fiber (222) and receive and send commands, often by way of a specialized communications protocol such as the previously discussed sockets protocol.

At a deeper level that exposes more details of the PHY units in both the QAM-RF packet processor (700) and the optional RF-upstream packet processor (704), The CMRTS unit (604) will normally comprise MAC and PHY units, and a data switch (710), at least one controller (often a microprocessor and associated software, not shown), various QAM modulators (712) to take the GigE data and convert, QAM modulate, and frequency shift the data as needed to fit the limited CATV RF bandwidth. To do this, CMRTS unit may employ a controllable clock generator (714) to control the frequency and timing of the QAM channels, as well as variable gain amplifier (VGA) units (716), (718) to help the PHY portions of the units manage the analog processes in converting signals back and forth between the CMRTS unit (300) and the cable RF signals.

As before, the MAC and PHY units and the data switch (710) switches, and the switches that control the QAM modulators (712) and analog to digital (A/D) units (720) may be remotely controlled by the virtual shelf manager (622) by local (embedded) controllers (often microprocessors) and associated applications software by commands to and from the Virtual Shelf software. As before, often these commands may be sent over the same optical fiber pathways normally used to transmit other data, and again may use socket based inter-process communication (IPC) protocols.

As before, for backward compatibility, the return process for processing upstream data can optionally implement the RF-A/D-O converters (601) and/or QAM demodulators (605) digitize and send the upstream signals back with essentially no modification other than digitization, data packet conversion, and optical conversion process.

Generally, the upstream data will be detected by whatever equipment is best suited to interpret the invention's various upstream data modulation methods—e.g. suitable equipment to intercept and decode the wider bandwidth upstream data and the like.

In this scheme, for simplicity, it is assumed that these methods will be implemented by high speed DSP or software controlled receiver that can amplify the various signals, digitize them, and then decode according to the appropriate algorithms, but of course other methods may also be used. Other hardware, such as ASICs, FPGA, DSP, and the like may also be used, as per U.S. patent application Ser. No. 13/555,170, the contents of which are incorporated herein by reference.

In one embodiment, variable gain amplifier (VGA) units (718) will convert the incoming upstream RF signal from the local neighborhood CATV cable into a signal which is then digitized by the A/D converter and clock generator, analyzed and repackaged by the MAC and PHY units (710) into a GigE or other optical fiber optimized signal, and then sent upstream along the optical fiber through various optical fiber splitter/combiner units (710). This process may be controlled by commands from the Virtual Shelf software.

Figure 9:
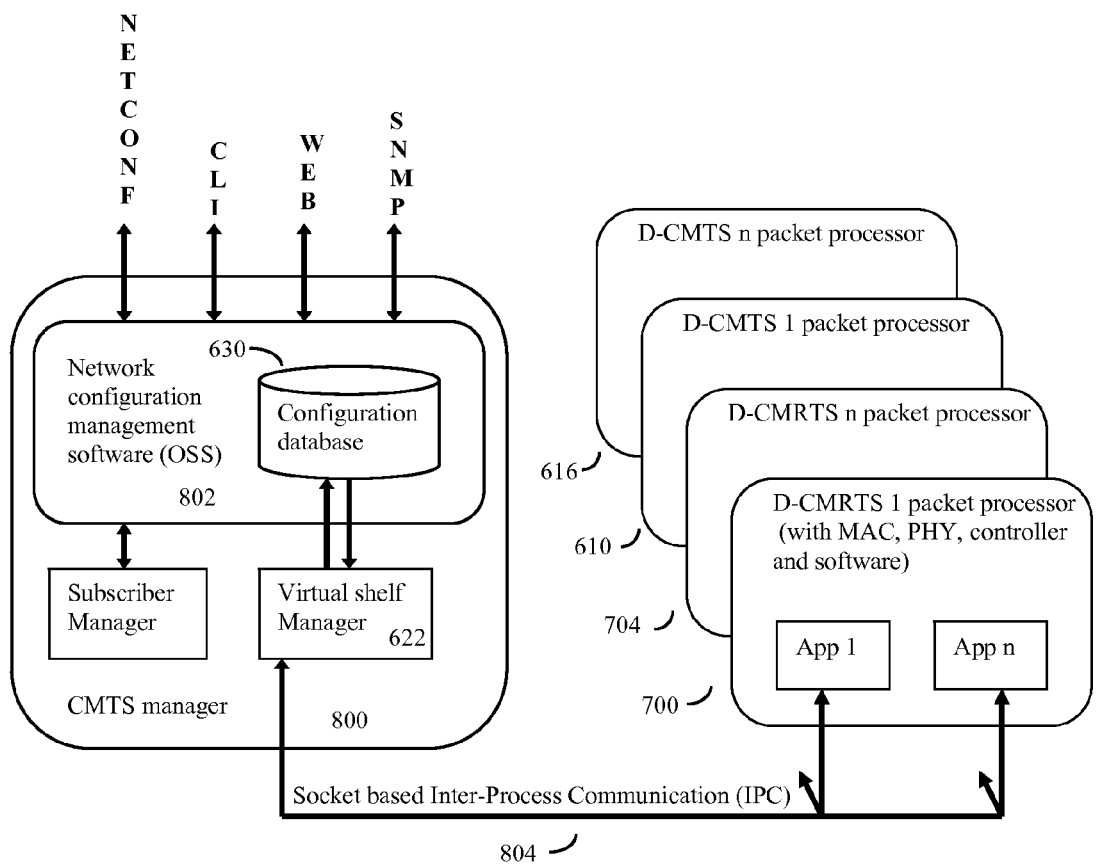
FIG. 9 shows more details of how the virtual shelf manager and the configuration database may control the functionality of most or all of the various D-CMRTS fiber nodes, and optionally other active nodes and switches in the HFC network system.

FIG. 9 shows more details of how the virtual shelf manager (622) and the configuration database (630) (previously shown in FIG. 7) may control the functionality of most or all of the plurality of D-CMRTS fiber nodes (300), improved D-CMTS (500) D-CMTS line cards (502), and optionally other active nodes and switches in the HFC network system.

In this example, the virtual shelf manager software (622) is shown running as a module of a broader D-CMTS manager software package (800); however it also may be run as a standalone package. The D-CMTS manager software (800), which will often be run on one or more computer processors which may be located at the cable head or other convenient location, will often be based on network configuration management software (802). Such network configuration software (802) (also called the Operational Support Systems (OSS) software) may be, for example, software based upon the ConfD network management software produced by Tail-f Systems Corporation, Stockholm Sweden (International location) and Round Hill Va. (US location).

In this embodiment, use of software such as ConfD is useful because this type of network management software also provides a number of convenient and commonly used interfaces to allow users to interact with the network and control then network configuration. These interfaces may include NETCONF management agents, SNMP agents, Command Line Interfaces (CLI), Internet (Web) interfaces, and other agents/interfaces as desired.

The virtual CMTS shelf software that may be used to control the status of the various D-CMTS line cards (500) and D-CMRTS fiber nodes (300) will often interact with a network configuration database (630) run under the control of this network configuration software (802). The virtual D-CMTS shelf software will in turn send commands out to most or all of the various remote D-CMRTS fiber nodes, as well as control the operation of the D-CMTS (500) at the cable head and other devices as desired. As previously discussed, one preferred way for this control to be achieved is by way of socket based inter-process communication (IPC) protocols and packets (804), which may be sent over the same optical fiber lines used to send the other data. In this situation, for example, controllers running various types of application software (Apps) in the plurality of remote packet processors (700), (704) in the remote D-CMRTS fiber nodes (300) can listen for appropriate commands from the virtual shelf manager (622), and adjust the operation of the D-CMRTS packet (700), (704) processors accordingly. These D-CMRTS fiber nodes can also transmit their status back to the virtual shelf manager using the same protocols.

The device configuration database (630) of the virtual shelf manager system will often have multiple data fields, including fields that contain the identification code and/or addresses of the various D-CMRTS units in the network (D-CMRTS identifier fields). The database will also usually have information on the status of the various cable modems connected to the various D-CMRTS units, including the cable modem identification data (cable modem identification data fields) and the privileges of the various users that are associated these various cable modems. For example, one user may have privileges to access a broad array of services high bandwidth upload and download data, while another user may have limited access to a different set of services and more limited upload and download data privileges. Other functions that may be implemented include event logging, Authentication, Authorization and Accounting (AAA) support, an extended version of a DOCSIS Management Information BASE (MIBs) functions, etc.

Other fields that normally will be in the database will include information as to user identification fields (user privilege fields), available extended DOCSIS channels, available IP addresses, instructions for how to remotely configure the various D-CMRTS software controllable switches, and instructions for how to remotely configure the various D-CMRTS software controllable RF packet processors.

The virtual shelf manager and configuration database, as well as other components of the system, will usually be run on a computer system with at least one microprocessor, as well as standard hardware and software, such as MAC and PHY units, that will enable the virtual shelf manager to send and receive data packets (often through the IPC protocol) to the various remote D-CMRTS units on the network.

The OSS software (802) can inform the virtual shelf manager software about the privileges, certificates, and encryption keys assigned to the various users. The OSS can also set policies or allocation limits regarding the frequency and bandwidth that will be assigned to the various channels. The OSS can also respond to queries from the virtual shelf manager when new modems are detected. The OSS can further take statistical data collected by the virtual shelf manager, such as packets transmitted and received, volume of data, and use this information for billing and network management purposes.

Further information on OSS functions, and more examples of functions that may be implemented in the OSS software for the invention, may be found in Misra, "OSS for Telecom Networks: An Introduction to Network Management", Springer (2004).

For example how this system would operate, consider the case where a new cable modem is first connected to the system. The cable modem may send an upstream signal (226) to the D-CMRTS (604). The RF-up packet processor (704) in the DCMRTS (604) will in turn collect the information relating to the cable modem identification number, and other relevant parameters, repackage the data in a digital format, and send it back upstream to the virtual shelf manager system on the fiber GigE link (302). The virtual shelf manager system (622) will look up the cable modem identification data in the device configuration database (630), and determine the privileges of the user associated with said cable modem identification data, and depending upon the value of the user privilege field, available extended DOCSIS channels, and available IP addresses, send data packets to the D-CMRTS (700) unit, often by way of the IPC protocol (804) that controls that particular cable modem. The virtual shelf manager may also control the function of any household gateway devices.

These data packets will interact with applications (e.g. App 1, App n) and configure the software controllable switch(s) on the D-CMRTS unit (700), to configure the software controllable switches on the QAM-RF packet processor (700) and the cable modem available IP addresses or TDD-FDD gateway addresses so as transmit downstream data to the cable modem on a first available DOCSIS channel. The data packets will also configure the software controllable RF packet processor (704) to receive upstream data from the cable modem on a second available DOCSIS upstream channel and IP address and retransmit the upstream data as a third upstream digital optical fiber signal (302).

Often the virtual shelf manager (622) will handle IP addresses for the cable modems and optional gateway devices through the proxy Dynamic Host Configuration Protocol (DHCP) service, or other method.

Alternative types of residential gateways capable of allowing household CATV equipment that is designed for the standard DOCSIS CATV protocols that call for the 5-42 MHz range of upstream frequencies to work with CATV cables an extended range of upstream frequencies are also possible. This gateway equipment will be designed to "fool" the household CATV equipment into thinking that it is connected to a standard CATV cable that is capable of carrying standard 5-42 MHz upstream data, but that this standard CATV cable is relatively uncongested—that is that a comparatively large portion of the 5-42 MHz spectrum is free for use. In fact, the gateway equipment may then either shift the frequency of the household 5-42 MHz upstream data (e.g. QAM channels) to an alternate frequency (e.g. convert a 20 MHz upstream QAM channel to, for example, a 100 MHz QAM channel) for transmission over the CATV cable, or alternatively convert the upstream QAM channel(s) into spread spectrum signals. In either event, the converted upstream signals will then be sent upstream on the CATV cable to the D-CMRTS optical fiber node, or other fiber node as appropriate. This data may then be converted to optical fiber data and sent on to the cable head as appropriate.

Adaptive cancellation methods, useful for such adjustable upstream/downstream frequency ranges were taught in copending application Ser. No. 13/400,415 "METHODS OF ADAPTIVE CANCELLING AND SECONDARY COMMUNICATIONS CHANNELS FOR EXTENDED CAPABILITY HFC CABLE SYSTEMS", the contents of which are incorporated herein by reference.

FIG. 10 shows an alternate type of residential gateway (1100) that can convert between a CATV cable system with an extended frequency allocated for upstream data (e.g. 5-547 MHz or alternative upstream range of frequencies), and residential equipment designed for the standard 5-42 MHz range of upstream frequencies.

Here CATV cable 226 is carrying extended range frequency upstream data (390), which may have far more upstream MHz bandwidth than the standard limited CATV 5-42 MHz upstream bandwidth. However the problem is that within the household, the CATV equipment—e.g. set top boxes, cable modems, may be legacy CATV equipment that only is capable of sending upstream data on the standard 5-42 MHz bandwidth. In this example, the gateway (1100) serving the house may be an extended FDD upstream gateway that contains the equipment necessary to frequency shift the household CATV equipment upstream signals to alternate frequencies for retransmission on the CATV cable (226). Thus, for example, the upstream data capability of a neighborhood could be extended about 10× by reallocating and transmitting the normal 5-42 MHz upstream data in a broader 5-547 MHz range, and tricking every household into thinking that it had free access to a 5-42 MHz upstream range of frequencies that was only 1/10 as congested as it was before.

As previously discussed, alternate types of gateways are also possible. Such alternative methods were discussed in copending application Ser. No. 13/035,993 "METHOD OF CATV CABLE SAME-FREQUENCY TIME DIVISION DUPLEX DATA TRANSMISSION", the contents of which are incorporated herein by reference.

Other alternative embodiments of the invention are also possible. In these alternative embodiments, the CMRTS or D-CMRTS units can have multiple outputs, such as multiple CATV cable outputs, or even a mix of CATV or Coax cable outputs and, other output types such as data outputs (e.g. GigE or other data output), telephony outputs, and the like.

Other applications: The present invention may also be used for alternative HFC configurations, such as copending application Ser. No. 13/346,709 "HFC CABLE SYSTEM WITH WIDEBAND COMMUNICATIONS PATHWAY AND COAX DOMAIN NODES", and Ser. No. 12/907,970 "HFC CABLE SYSTEM WITH SHADOW FIBER AND COAX FIBER TERMINALS", the contents of which are incorporated herein by reference.

The invention claimed is:

1. A digital optical fiber node system for a Hybrid Fiber Cable (HFC) network, the system comprising:
 a cable head end (CHE) located at a central office;
 a plurality of digital optical fiber nodes that each comprises a processor, a memory, and an address stored either in the processor or the memory, each of the plurality of digital optical fiber nodes at a location remote from the central office for receiving digital data from the CHE and for generating downstream radio frequency RF signals based on the received digital data that is directed to the digital optical fiber node's specific address, the received digital data comprising Quadrature Amplitude Modulation (QAM) symbols carried by IP packets; and
 a multiple port switch disposed at the CHE or between the CHE and the plurality of digital optical fiber nodes that is configured to read specific digital optical fiber node addresses associated with the received digital data and to direct any of the digital data that has a specific digital optical fiber node address to a particular digital optical fiber node that has a particular address corresponding to the specific digital optical fiber node address, wherein the CHE exchanges digital data with each digital optical fiber node over an optical fiber, and the digital optical fiber node is in RF communication with a plurality of cable modems for transmitting the generated downstream RF signals, wherein the generated downstream RF signals comprise RF waveforms modulated according to the received QAM symbols.

2. The system of claim 1, wherein the system further comprises at least one downstream converter device disposed at the CHE or between the CHE and the optical fiber, the downstream converter device configured to accept RF signals from the CHE and to digitize the RF signals into digital samples or to demodulate the RF signals into QAM symbols.

3. The system of claim 1, wherein the digital optical fiber node further comprises a RF digital converter device configured to accept upstream RF waveforms transmitted over a cable television (CATV) cable and to digitize the upstream RF waveforms, in order to produce digitally encoded upstream RF channel data.

4. The system of claim 3, wherein the CATV cable and the digital optical fiber node are further configured to enable variable frequency cutoff between RF frequencies designated for upstream transmissions and RF frequencies designated for downstream transmissions.

5. The system of claim 3, wherein the digital optical fiber node is further configured with at least one filter bank, and wherein the digitization of the upstream RF waveforms is done by subband decomposition.

6. The system of claim 3, wherein the system further comprises at least one upstream converter device disposed at the CHE or between the CHE and the optical fiber, the upstream converter device configured to accept digitally encoded upstream RF channel data from the optical fiber and to convert the digitally encoded RF channel data back into upstream RF waveforms.

7. The system of claim 1, wherein the CHE exchanges data with an IP backbone over a digital connection.

8. The system of claim 1, wherein the received digital data further comprises digitized RF samples carried by IP packets, wherein the generated downstream RF signals further comprise RF waveforms that are reconstituted from the RF samples.

9. The system of claim 1, wherein the digital optical fiber node comprises an IP to QAM conversion device configured to accept downstream digital IP data packets transmitted over the optical fiber as the digital data, and to modulate these digital IP data packets into one or more downstream IP based RF QAM channels as the generated RF signals.

10. The system of claim 1, wherein the digital optical fiber node comprises a RF combiner device configured to combine generated RF signals from different channels for downstream transmission over the CATV cable.

11. The system of claim 1, wherein the downstream RF signals further comprise analog National Television System Committee (NTSC) television channels or frequency modulation (FM) audio channels or Quadraphase-shift keying (QPSK) channels or IP based RF QAM channels, the QAM modulated RF waveforms comprise standard definition or high definition digital television channels, and the IP based RF QAM channels comprise data over cable service interface specifications (DOCSIS) channels, edge QAM channels, video on demand channels, and IP data streams.

12. A method of transmitting data over a Hybrid Fiber Cable (HFC) network, the method comprising:

at a digital optical fiber node of a plurality of digital optical fiber nodes that each with a unique address:

receiving from a multiport switch disposed at a cable head end (CHE) or between the CHE and the plurality of digital optical fiber nodes over an optical fiber, downstream data comprising a specific digital optical fiber node address that corresponds to the digital optical fiber node's unique address, the received downstream data comprising Quadrature Amplitude Modulation (QAM) symbols carried by IP packets; and generating downstream radio frequency (RF) signals based on the received downstream data for a plurality of cable modems, the generated downstream RF signals comprise RF waveforms modulated according to the QAM symbols, wherein the CHE is at a central office and each of the plurality of digital optical fiber nodes is at a location remote from the central office.

13. The method of claim 12, wherein the received downstream data further comprises either digital samples that are digitized from downstream RF waveforms by a converter device or QAM symbols that are demodulated from the downstream RF waveforms by the converter device, wherein the converter device is disposed at the CHE or between the CHE and the digital optical fiber node to accept downstream RF waveforms from the CHE.

14. The method of claim 12 further comprising, at the digital optical fiber node of the plurality of digital optical fiber nodes:

receiving upstream RF waveforms transmitted over a cable television (CATV) cable from the plurality of cable modems;

digitizing the received upstream RF waveforms to produce digitally encoded upstream RF channel data; and transmitting the digitally encoded upstream RF channel data to the CHE using the optical fiber.

15. The method of claim 14, wherein the CATV cable and the digital optical fiber node are further configured to enable variable frequency cutoff between RF frequencies designated for upstream transmissions and RF frequencies designated for downstream transmissions.

16. The method of claim 14 further comprising using at least one filter bank in the digital optical fiber node to decompose the upstream RF waveforms into a plurality of subbands, wherein digitizing the received upstream RF waveforms comprises using at least some of the plurality of subbands.

17. The method of claim 14, wherein at least one of the transmitted digitally encoded upstream RF channel data is converted back into upstream RF waveforms by an upstream converter device that is disposed at the CHE or between the CHE and the digital optical fiber node.

18. The method of claim 12, wherein the downstream RF signals further comprise analog National Television System Committee (NTSC) television channels or frequency modulation (FM) audio channels or Quadraphase-shift keying (QPSK) channels or IP based RF QAM channels, the QAM modulated RF waveforms comprise standard definition or high definition digital television channels, and the IP based RF QAM channels comprise data over cable service interface specifications (DOCSIS) channels, edge QAM channels, video on demand channels, and IP data streams.

* * * * *